(12) United States Patent
Sugimoto et al.

(10) Patent No.: US 8,027,924 B2
(45) Date of Patent: *Sep. 27, 2011

(54) PLAYBACK APPARATUS, PLAYBACK AUTHORIZATION SERVER, PROGRAM, AND SYSTEM INTEGRATED CIRCUIT

(75) Inventors: Noriko Sugimoto, Hyogo (JP); Yusuke Shimizu, Osaka (JP); Masayuki Kozuka, Osaka (JP)

(73) Assignee: Panasonic Corporation, Osaka (JP)

( * ) Notice: Subject to any disclaimer, the term of this patent is extended or adjusted under 35 U.S.C. 154(b) by 1070 days.

This patent is subject to a terminal disclaimer.

(21) Appl. No.: 10/586,240

(22) PCT Filed: Jan. 27, 2005

(86) PCT No.: PCT/JP2005/001548
§ 371 (c)(1),
(2), (4) Date: Jul. 17, 2006

(87) PCT Pub. No.: WO2005/071678
PCT Pub. Date: Aug. 4, 2005

(65) Prior Publication Data
US 2007/0160343 A1 Jul. 12, 2007

Related U.S. Application Data

(63) Continuation-in-part of application No. 10/764,470, filed on Jan. 27, 2004, now Pat. No. 7,765,158.

(51) Int. Cl.
*G06Q 99/00* (2006.01)
(52) U.S. Cl. .................................................. 705/57
(58) Field of Classification Search .................. None
See application file for complete search history.

(56) References Cited

U.S. PATENT DOCUMENTS

| 5,574,567 A | 11/1996 | Cookson et al. |
| 5,598,276 A | 1/1997 | Cookson et al. |
| 5,691,972 A | 11/1997 | Tsuga et al. |
| 5,903,705 A | 5/1999 | Yonemitsu et al. |
| 6,141,483 A | 10/2000 | Yamada et al. |

(Continued)

FOREIGN PATENT DOCUMENTS

EP  0 851 418  7/1998

(Continued)

OTHER PUBLICATIONS

Derfler, Jr., et al., "How Networks Work," Best Seller Edition, Ziff-Davis Press, licensed to Macmillan Computer Publishing USA, 1993, pp. 1-70.

Muller, Nathan J., "Desktop Encyclopedia of the Internet," Artech House, Inc., 1999, pp. 1-51.

(Continued)

*Primary Examiner* — Andrew J. Fischer
*Assistant Examiner* — Jacob C. Coppola
(74) *Attorney, Agent, or Firm* — Wenderoth Lind & Ponack, L.L.P.

(57) ABSTRACT

A playback apparatus judges whether a region code assigned to a BD-ROM matches a region code assigned to the playback apparatus. When the judgment result is in the affirmative, the playback apparatus plays back the content recorded on the optical disc. When the judgment result is in the negative, the playback apparatus does not play back the content, except when an exceptional playback is authorized. The exceptional playback is authorized when a combination of the content identifier of the content to be played back and the apparatus region code satisfies a predetermined condition defined by an owner of the rights of the content.

7 Claims, 26 Drawing Sheets

U.S. PATENT DOCUMENTS

| | | | |
|---|---|---|---|
| 6,278,836 | B1 | 8/2001 | Kawara et al. |
| 7,239,417 | B2 | 7/2007 | Yoshii et al. |
| 2001/0007545 | A1 | 7/2001 | Ueda et al. |
| 2002/0168086 | A1 | 11/2002 | Sugahara |
| 2003/0016744 | A1 | 1/2003 | Nakagawa |
| 2003/0090711 | A1 | 5/2003 | Yoshii et al. |
| 2003/0174837 | A1 | 9/2003 | Candelore et al. |
| 2007/0124602 | A1* | 5/2007 | Wald et al. .................... 713/193 |

FOREIGN PATENT DOCUMENTS

| | | |
|---|---|---|
| EP | 1 115 117 | 7/2001 |
| JP | 10-125004 | 5/1998 |
| JP | 11-110914 | 4/1999 |
| JP | 2002-163858 | 6/2002 |
| JP | 2003-9102 | 1/2003 |
| JP | 2003-338124 | 11/2003 |

OTHER PUBLICATIONS

Gralla, Preston, "How the Internet Works," Millennium Edition, QUE Corporation, a division of Macmillan Computer Publishing USA, Aug. 1999, pp. 1-36.

White, Ron, "How Computers Work," Millennium Edition, QUE Corporation, a division of Macmillan Computer Publishing USA, Sep. 1999, pp. 1-84.

Sakamoto et al: "Introduction of the Content ID Forum (cIDf)" Applications and the Internet, 2002. (Saint 2002). Proceedings. 2002 Symposium on Nara, Japan, Jan. 28-Feb. 1, 2002, Los Alamitos, CA, USA, IEEE Comput. Soc, US, Jan. 28, 2002, pp. 128-129, XP010587835.

Office Action and PTO-892 issued Aug. 26, 2008 in U.S. Appl. No. 10/764,470.

\* cited by examiner

FIG.4

PLAYBACK AUTHORIZATION LIST

| | Content ID | Region Code | EXCLUSION INFORMATION | DISTRIBUTION COMPANY INFORMATION | RELEASE DATE INFORMATION |
|---|---|---|---|---|---|
| PLAYBACK AUTHORIZATION INFORMATION 1 | 4GH | 1 | EXCLUSIVE | COMPANY AAA | 10/02/2002 |
| PLAYBACK AUTHORIZATION INFORMATION 2 | 4GH | 2 | NON-EXCLUSIVE | COMPANY BBB | 01/23/2002 |
| PLAYBACK AUTHORIZATION INFORMATION 3 | QW1 | 2 | EXCLUSIVE | COMPANY CCC | 01/24/1998 |

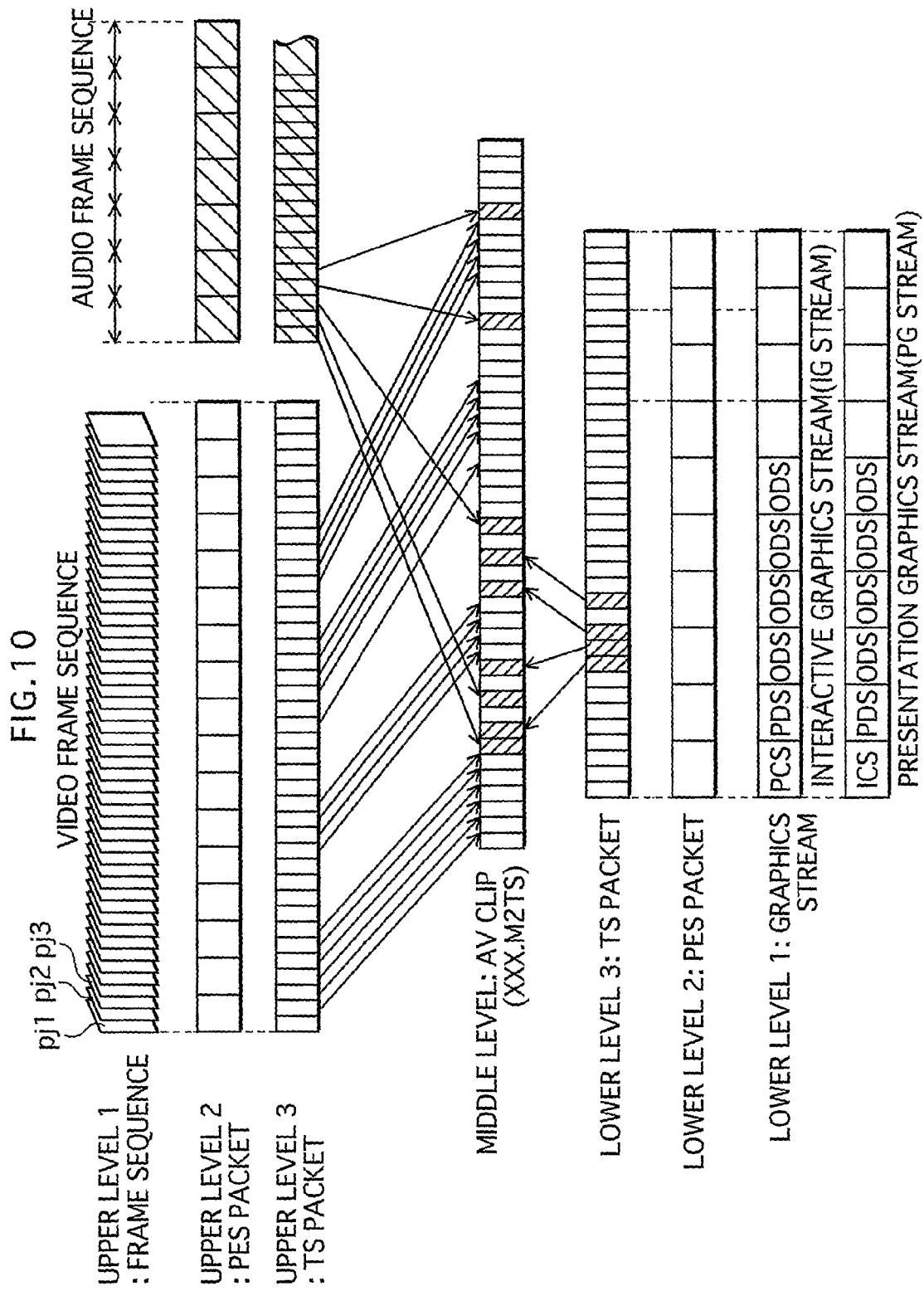

FIG.22

US-RELEASE VERSION

```
function{
 PlayPL(PL#1,PI#1);
 PlayPL(PL#2,PI#1);
 PlayPL(PL#3,PI#1);
}
```

Java APPLICATION

```
function{PlayPL(PL#1,PI#1)
if(SPRM(0)=="Japanese"){
PlayPL(PL#4,PI#1);
}else{
PlayPL(PL#2,PI#1);}
PlayPL(PL#3,PI#1);
}
```

IN LOCAL STORAGE

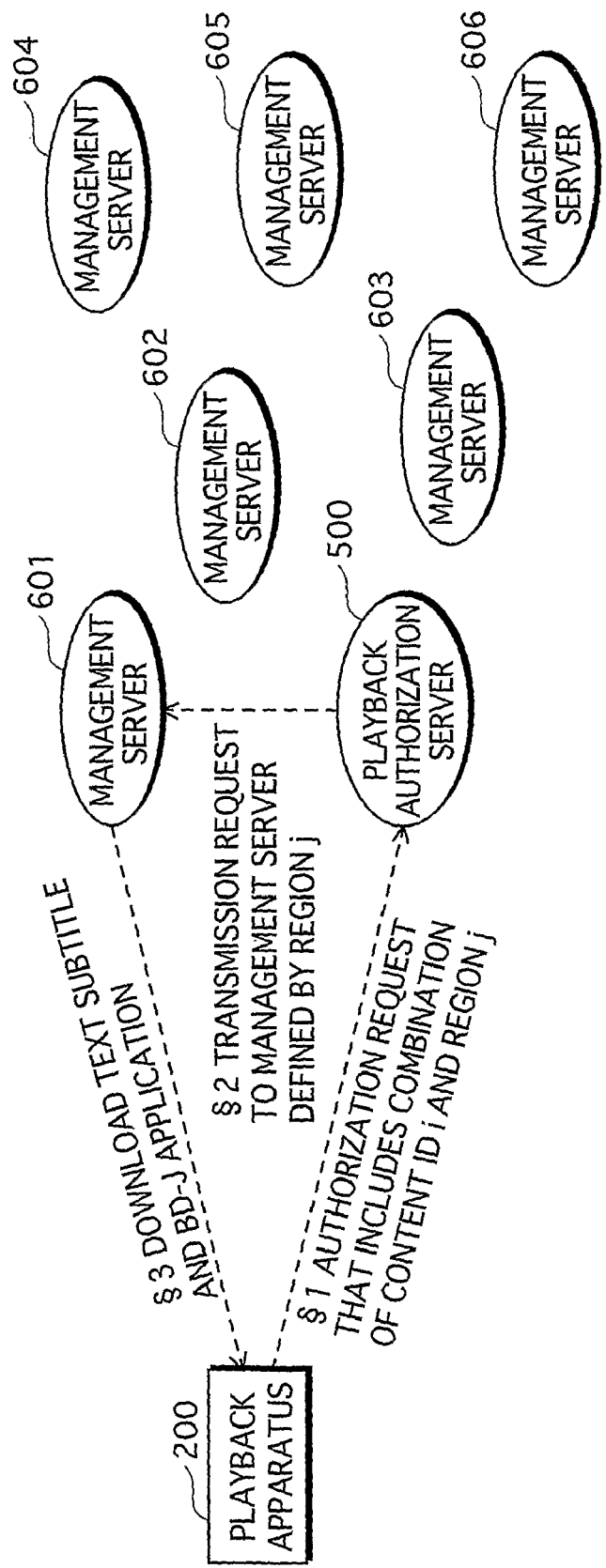

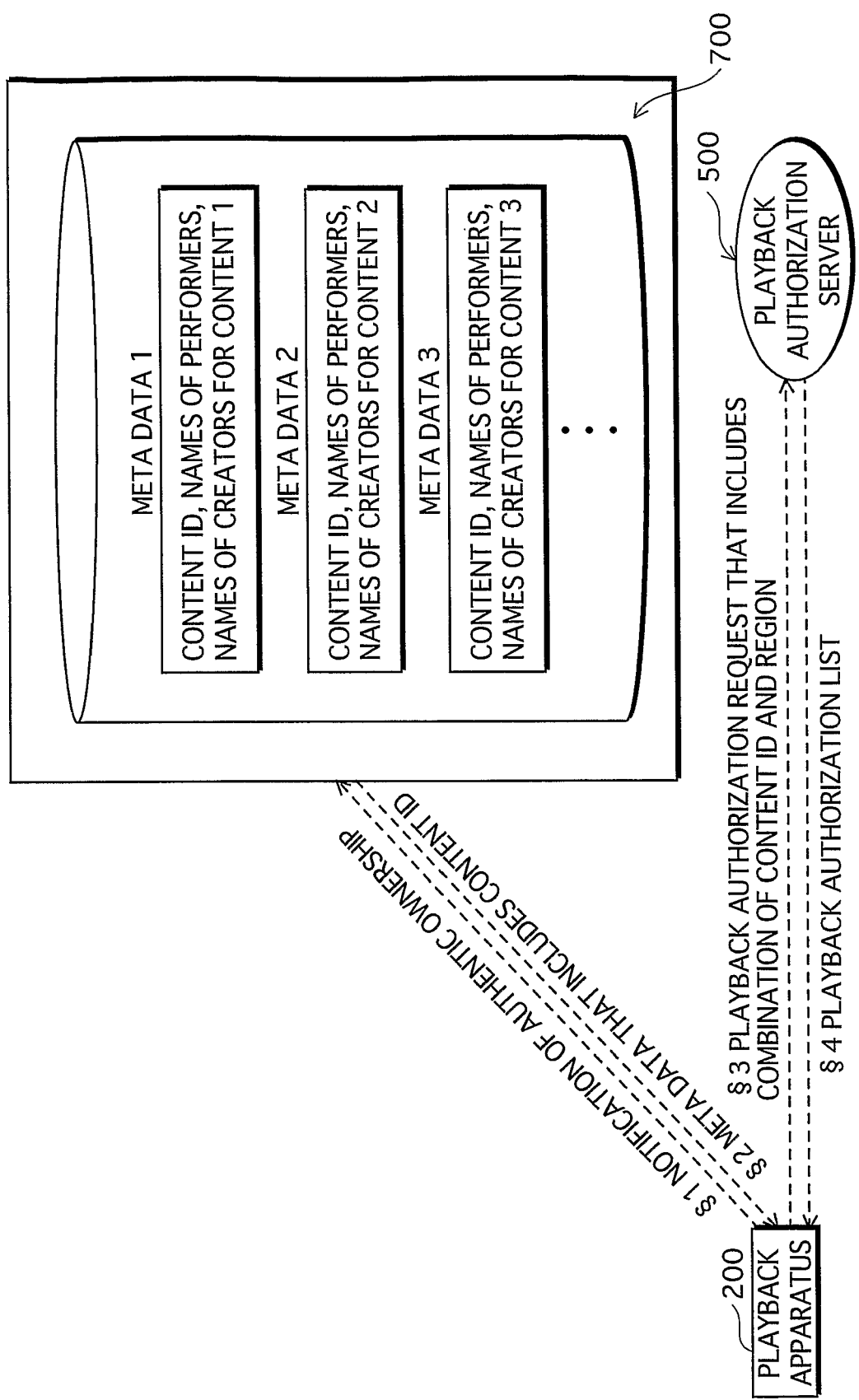

PLAYBACK APPARATUS, PLAYBACK AUTHORIZATION SERVER, PROGRAM, AND SYSTEM INTEGRATED CIRCUIT

This application is a National Stage Application of International Application Number PCT/JP2005/001548, filed on Jan. 27, 2005, which claims priority to and is a continuation-in-part of U.S. application Ser. No. 10/764,470, filed on Jan. 27, 2004, now U.S. Pat. No. 7,765,158.

BACKGROUND OF THE INVENTION

1. Field of the Invention

The present invention relates to playback control techniques for playing back digitalized movie productions and relates to improvement in order to apply these techniques to playback apparatuses for optical discs and playback authorization servers.

2. Description of the Related Art

Distribution of movie productions, via optical discs, is one of the main sources of income of the movie businesses including, for example, the movie business of Hollywood. In order to be successful in the movie businesses, it is necessary to solve sensitive problems in each distribution area, such as problems related to the relationships with the distribution company in the distribution area, the release period of the movie in the distribution area, and the ethical, historical, or religious viewpoints in the distribution area. In order to solve these problems altogether, the region code system is used in DVDs and playback apparatuses. A region code indicates a region in which it is possible to play back the DVD. When a DVD is loaded, a playback apparatus reads the region code recorded on the DVD, and judges whether the region code matches the region code of the playback apparatus itself. When the read region code is in accordance, the DVD will be played back. When the read region code is not in accordance, the DVD will not be played back. Due to this region code system, DVDs are distributed only within the area where they are sold, and the distribution does not expand to outside the area represented by the appropriate region code. Accordingly, the aforementioned various sensitive problems are solved altogether.

Two DVDs having a same movie recorded thereon, for example, one distributed in Japan and the other distributed in the U.S.A., could be different in terms of their image qualities and interactive functions. More specifically, some of the DVDs for Japan undergo re-encoding of moving images so that subtitles and Japanese audio can be added. In such a case, the image quality is different from that of the DVDs for the U.S.A. In addition, sometimes an extra bonus called an Easter Egg and the interactive functions associated with the Easter Egg are provided only in the DVDs for the U.S.A. Because there are such differences, many of Japanese business persons who have been living in the U.S.A. for a long time collect and treasure U.S.A. versions of DVDs. When such a business person comes back to Japan and tries to play back the DVDs in his collection on the playback apparatus owned by his family, he finds out that the playback of those DVDs on the playback apparatuses in Japan are prohibited because of the difference in the region codes. Since he is not able to play back the DVDs on playback apparatuses in Japan, the value of his collection, which is personal property, is lowered. The drop in the value gives a bad impression to the user who has purchased the DVDs. It is, however, quit difficult to abolish the restraint with region code system because there are sensitive issues such as the one related to the relationship with the distribution companies in the distribution areas and the like.

BRIEF SUMMARY OF THE INVENTION

An object of the present invention is to provide a playback apparatus that does not lower the values of movie discs that a user has collected abroad while having sensitive problems solved such as the one related to the relationship with the distribution companies in the distribution areas and the ethical, historical, or religious viewpoints in the distribution areas.

In order to achieve the object, the present invention provides a playback apparatus for optical discs, comprising: a judging unit operable to judge whether a disc region code assigned to an optical disc matches an apparatus region code assigned to the playback apparatus; a playback unit operable to, (i) when the judging unit judges in the affirmative, play back a content recorded on the optical disc, and (ii) when the judging unit judges in the negative, not playback the content except when an exceptional playback is authorized, wherein the exceptional playback is authorized when a combination of a content identifier of the content and the apparatus region code satisfies a predetermined condition defined by a right owner of the content.

According to this arrangement of the playback apparatus, even if the region code on the optical disc does not match the region code of the playback apparatus, it is possible to play back a content (a movie production) in a single form when predetermined conditions are satisfied. When the playback apparatus judges that the collection of works collected in the U.S.A. satisfies the predetermined conditions, it becomes possible to play the works back on a playback apparatus sold in Japan. In addition, in a case where it is not desirable to allow a particular content to be played back due to the relationship with the distribution company in the distribution target area, the predetermined conditions are not satisfied. Therefore, it is possible to protect the vested interest of the distribution company in the distribution target area. The copyright owner is not able to avoid aggravating the relationship with the distribution company in the area to which the playback apparatus belongs. Further, in a case where the release period of a content is different from one region to another in the world, it is possible to respect the release period designated to each region. Thus, the order of movie productions distribution constructed with the region code system will not be disrupted.

BRIEF DESCRIPTION OF THE DRAWINGS

FIG. 4 shows an example of a playback authorization list;

FIG. 10 schematically shows how an AV clip is structured;

FIG. 22 shows what kind of subtitle display is available from PlayList information and SubPlayItem information in the local storage 7;

FIG. 25 shows the structures of the playback authorization server 500 and the management servers 601 to 606 according to the second embodiment; and FIG. 26 shows the DB server 700 according to the fourth embodiment.

DETAILED DESCRIPTION OF THE INVENTION

First Embodiment

Figure 1:
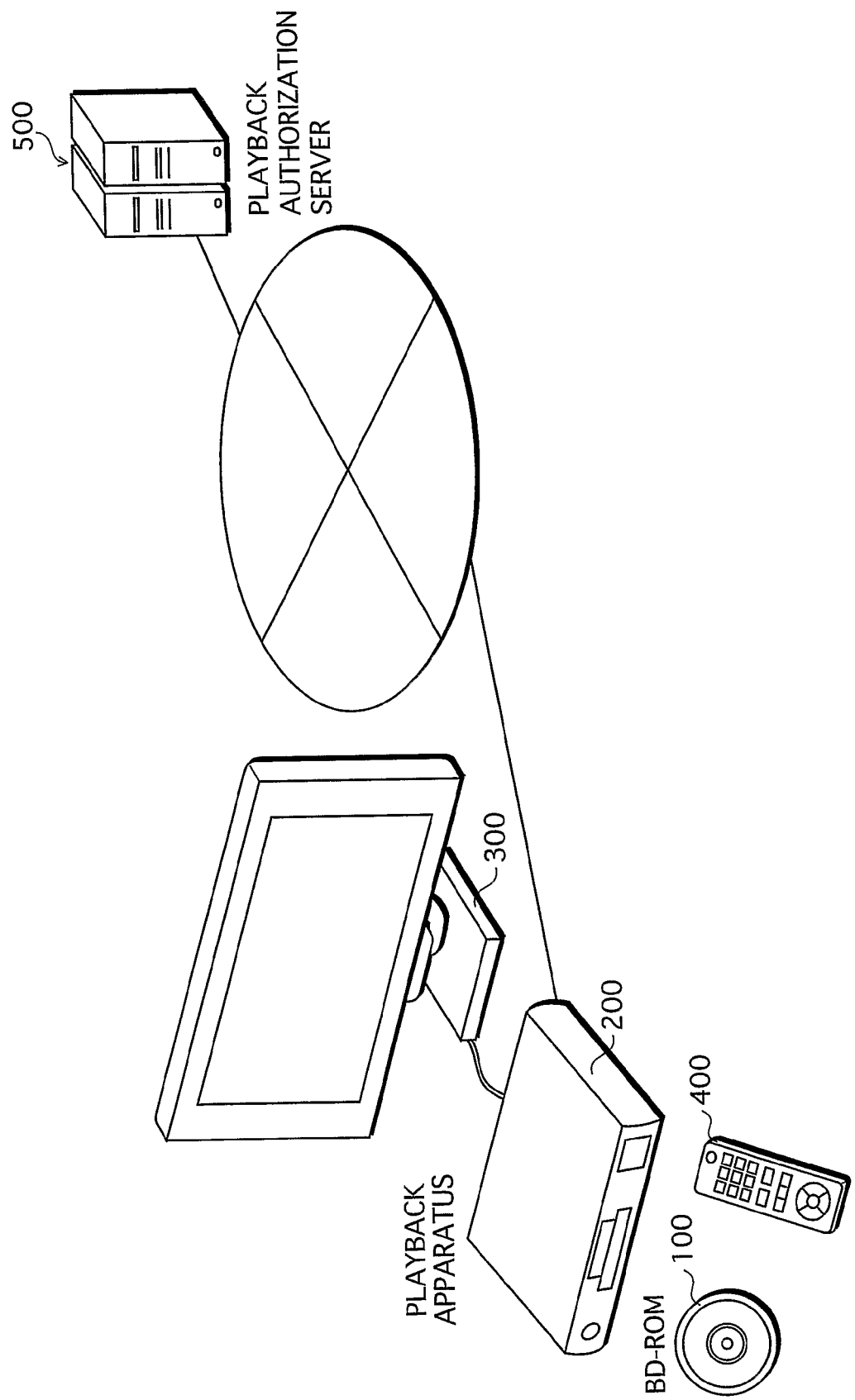
FIG. 1 is an embodiment of usage of the playback apparatus 200 of the present invention.

The following describes embodiments of the playback apparatus 200 of the present invention. First of all, among different actions with the playback apparatus 200 of the present invention, an embodiment of usage will be explained. FIG. 1 shows an embodiment of usage of the playback apparatus 200 of the present invention. In FIG. 1, the playback apparatus of the present invention is referred to as the playback apparatus 200. A home theater system is formed with the playback apparatus 200, a television 300, and a remote controller 400. The BD-ROM 100 is a recording medium to supply a movie production to this home theater system. The playback apparatus 200 serves to play back the contents recorded on the BD-ROM 100, according to a user operation on the remote controller 400.

The home theater system is characterized with that the playback apparatus 200 is connected with the playback authorization server 500 via a network.

Figure 2:
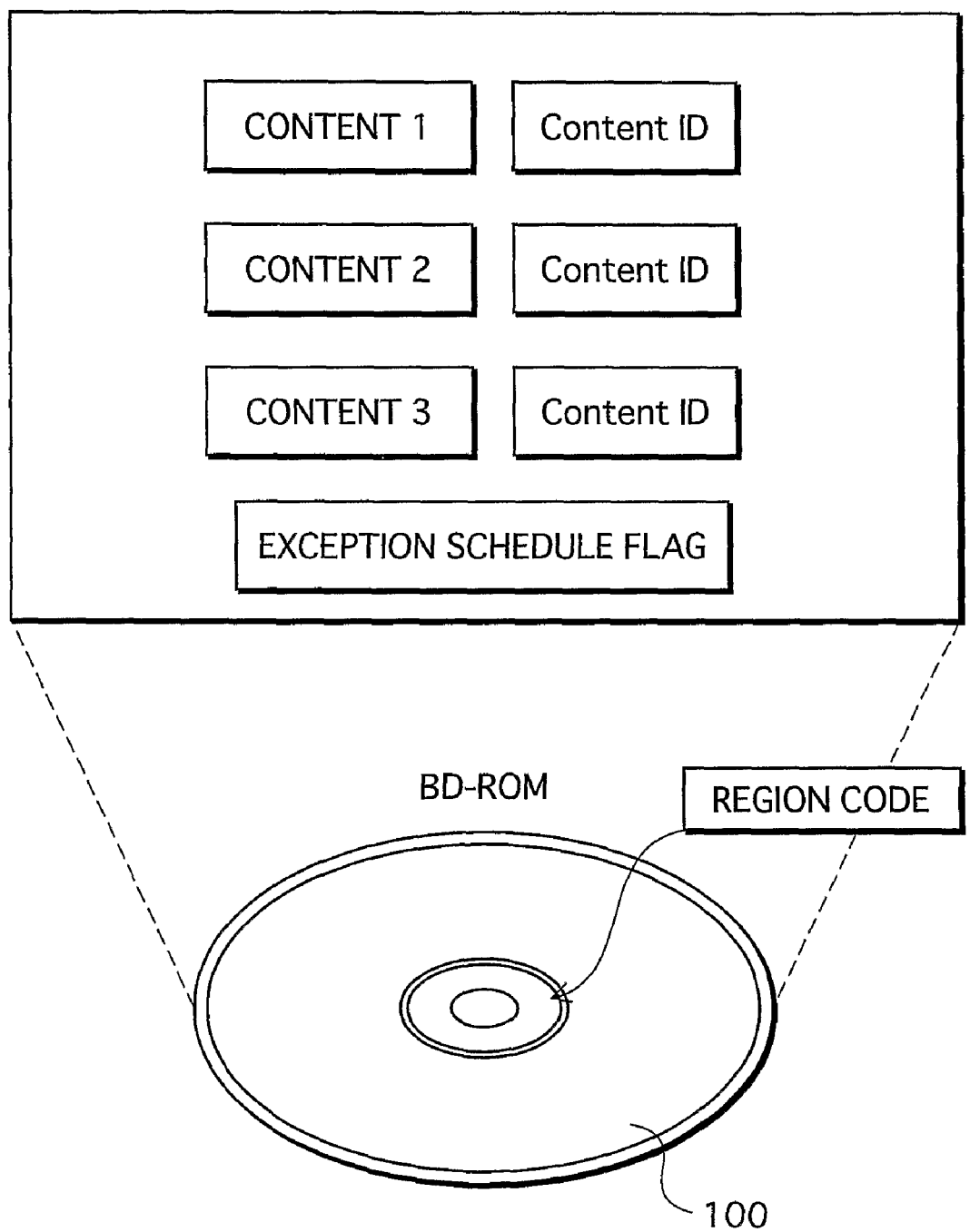
FIG. 2 shows the internal structure of a BD-ROM of the embodiment.

The following describes the BD-ROM in this home theater system. FIG. 2 shows the internal structure of the BD-ROM 100 of the present embodiment. The BD-ROM 100 shown in the drawing is a read-only optical disc on which one or more contents are recorded. A region code is recorded in the lead-in area, which is the innermost track of the BD-ROM 100. One or more contents (Content 1, Content 2, and Content 3) and an exception schedule flag are recorded in the volume area. The region code indicates a region in which it is possible to play back the BD-ROM 100. The contents are each in correspondence with a content-ID. The content-ID is an identifier that uniquely identifies a content. The exception schedule flag is a flag that indicates whether an exceptional playback is scheduled or not when the region code on the BD-ROM 100 does not match the region code of the playback apparatus 200.

Figure 3:
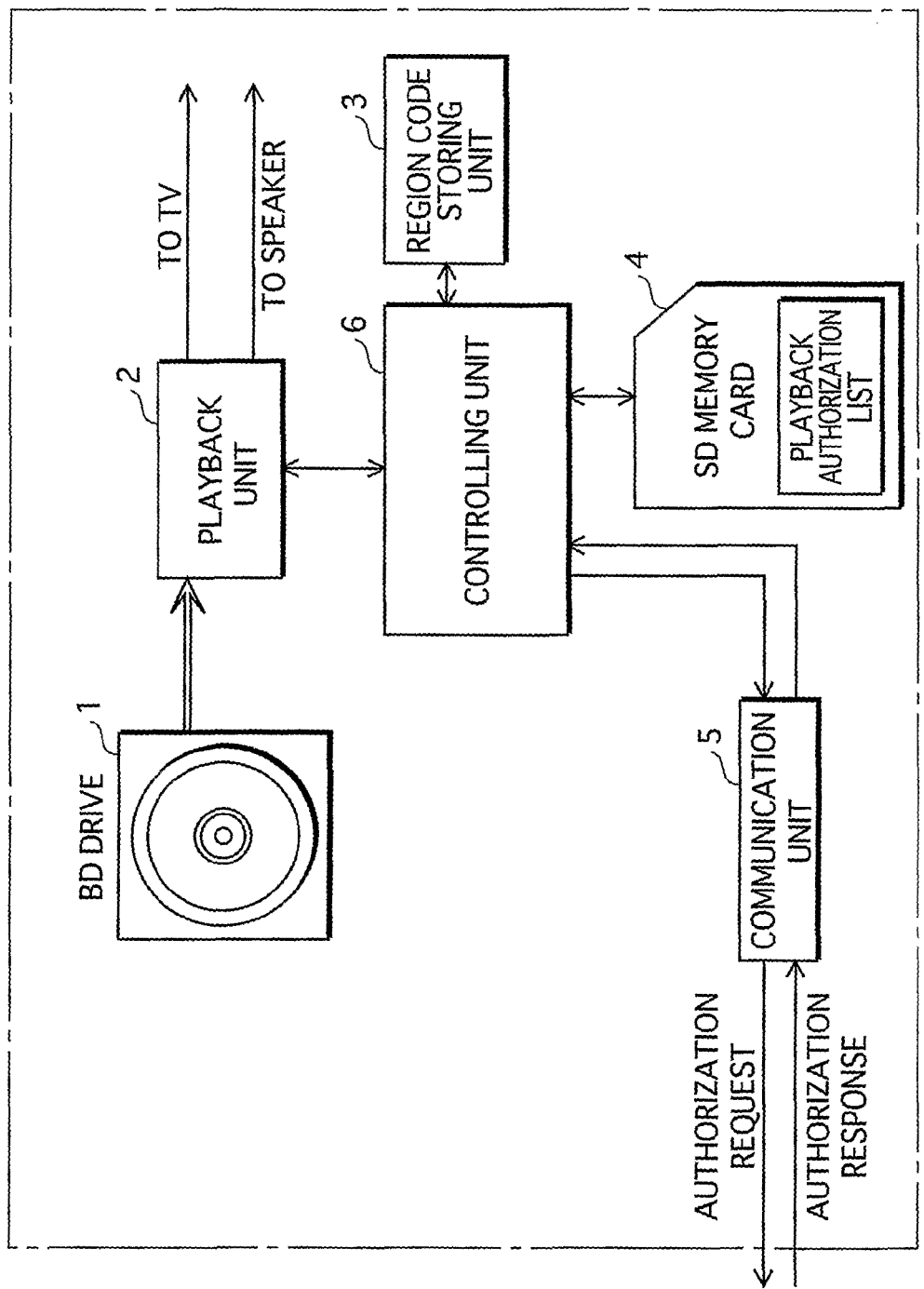
FIG. 3 shows the internal structure of the playback apparatus 200.

The following explains the internal structure of the playback apparatus 200. FIG. 3 shows the internal structure of the playback apparatus 200. As shown in the drawing, the playback apparatus 200 comprises: a BD drive 1; a playback unit 2; a region code storing unit 3; an SD memory card 4; a communication unit 5; and a controlling unit 6.

The BD drive 1 performs loading/ejecting of BD-ROMs, and accesses loaded BD-ROMs.

The playback unit 2 includes a video decoder for decoding moving images, an audio decoder for decoding audio, a graphics decoder for decoding subtitles, and plays back the contents recorded on BD-ROMs.

The region code storing unit 3 stores therein, in an unrewritable form, a region code assigned to a region in which the playback apparatus 200 is/was sold.

The SD memory card 4 is a secure recording medium in which a playback authorization list is stored. The playback authorization list includes a plurality of pieces of playback authorization information.

The communication unit 5 accesses the playback authorization server 500 run by a copyright owner of a content and transmits an authorization request. The authorization request is made when both of the following conditions are satisfied: (i) the region code on the BD-ROM 100 does not match the region code of the playback apparatus 200, and (ii) the judgment result on playback authorization that is made with reference to the playback authorization list is non-authorization. The authorization request transmitted here includes the content-ID of the content, and the region code of the playback apparatus 200. It is arranged this way so that the authorization judgment with reference to the playback authorization information is made by the playback authorization server 500.

The controlling unit 6 is atypical computer system that includes a CPU, a ROM having programs stored, and a RAM. The integrated control of the playback apparatus 200 is achieved through the CPU's reading of the programs stored in the ROM as well as the collaboration of the programs and hardware resources.

As additional information, the functional blocks such as the playback unit 2, the region code storing unit 3, the communication unit 5, and the controlling unit 6, are typically realized as an LSI. These functional blocks may be realized as LSIs individually. Alternatively, they may be realized as a system LSI that includes a part or all of them.

Further, the method for integration is not limited to LSIs, and it is also possible to realize the integration with a specialized processor or a general processor. Furthermore, when an alternative technique for making integrated circuits is available besides LSIs, due to development in semiconductor technology or another derivative technique, it would be possible to perform the integration using such a technique, needless to say.

The following explains the playback authorization list recorded on the SD memory card 4. FIG. 4 shows an example of playback authorization list. As shown in the drawing, the playback authorization list includes a plurality of pieces of playback authorization information.

Each piece of playback authorization information is a combination of a content-ID and a region code to which "exclusion information", "Distribution Company information", and "Release Date information" are attached. The combinations of a content-ID and a region code (4 GH and 1; 4 GH and 2; and QW1 and 2 in the drawing) each indicate that authorization to play back the content identified with the content ID is given to the playback apparatuses 200 in the region identified with the region code.

In each piece of playback authorization information, "exclusion information", "Distribution Company information", and "Release Date information" that are attached to the combination of a content-ID and a region code indicates the conditions of authorization for the combination.

"Exclusion information" indicates that the playback authorization provided for the content is exclusive. Since an authorization conditioned with a piece of exclusion information is exclusive, when one of pieces of playback authorization information in the playback authorization list is indicated as "exclusive", it means that the playback apparatus 200 must delete, from the playback authorization list, one or more pieces of playback authorization information that have an identical content ID as the content ID included in the one of the pieces of playback authorization information. Even if the playback authorization list includes three pieces of playback authorization information which indicate that the content is authorized to be played back in three regions in the world, when an exceptional playback is performed for one of the pieces of playback authorization information, the other pieces of playback authorization information will be deleted. This way, it is possible to make the restriction against duplicated playback stricter.

"Distribution Company information" shows who is the distributor in the region identified with the region code in each combination (Company AAA, Company BBB, and Company CCC in the drawing). When a movie production is distributed to all over the world, the copyright owner enters into a contract with the distributor in each region so that the distribution of the movie production in the region is monopolistically performed by the distributor. Here, for example, the vested interest of the distributor would be damaged when a BD-ROM 100 sold in another region is brought into the region that is under the control of the distributor. It is quite possible that the relationship with the distributor gets aggravated.

Thus, in the playback authorization information, "Distribution Company information" is provided for each combination of a content-ID and a region code. When an exceptional playback is to be performed, it is judged whether the Distribution Company information on the BD-ROM 100 matches the Distribution Company information of the playback apparatus 200. When the Distribution Company information on the BD-ROM 100 does not match the Distribution Company information of the playback apparatus 200, playback is prohibited since there is a chance that the vested interest of the distribution company in the region to which the playback apparatus 200 belongs may be damaged. When the Distribution Company information on the BD-ROM 100 matches the Distribution Company information of the playback apparatus 200, and the distributors in both regions are the same, there is no vested interest to be damaged. Therefore, playback is authorized. Thus, the exceptional playback is performed within the range in which the vested interest of the distributor is not damaged.

"Release Date information" indicates when the content is released in the region identified with the region code in each combination (Oct. 2, 2002; Jan. 23, 2002; and Jan. 24, 1998 in the drawing). When the current time clocked in the playback apparatus 200 is past the release date, playback is authorized. When the current time is not past the release date, playback is unauthorized. The Release Date information as this is essential to respecting a business method called "time shift". "Time shift" is a business method by which the time to distribute optical discs in the non-English-speaking world is delayed, for example, the optical discs are distributed to the U.S.A. first, and then to the Western Europe and Japan, and then to the Eastern Europe and the rest of Asia. When a BD-ROM 100 to be played back is brought in from another region, it is not desirable that the contents on the BD-ROM 100 can be played back before the release date for the region to which the playback apparatus 200 belongs. Hence, the Release Date information is attached to the playback authorization information so that such an ahead-of-release playback can be prevented.

The structure of the playback authorization list has been explained so far. The following explains the processing procedure performed by the controlling unit 6 with the use of the playback authorization list.

Figure 5:
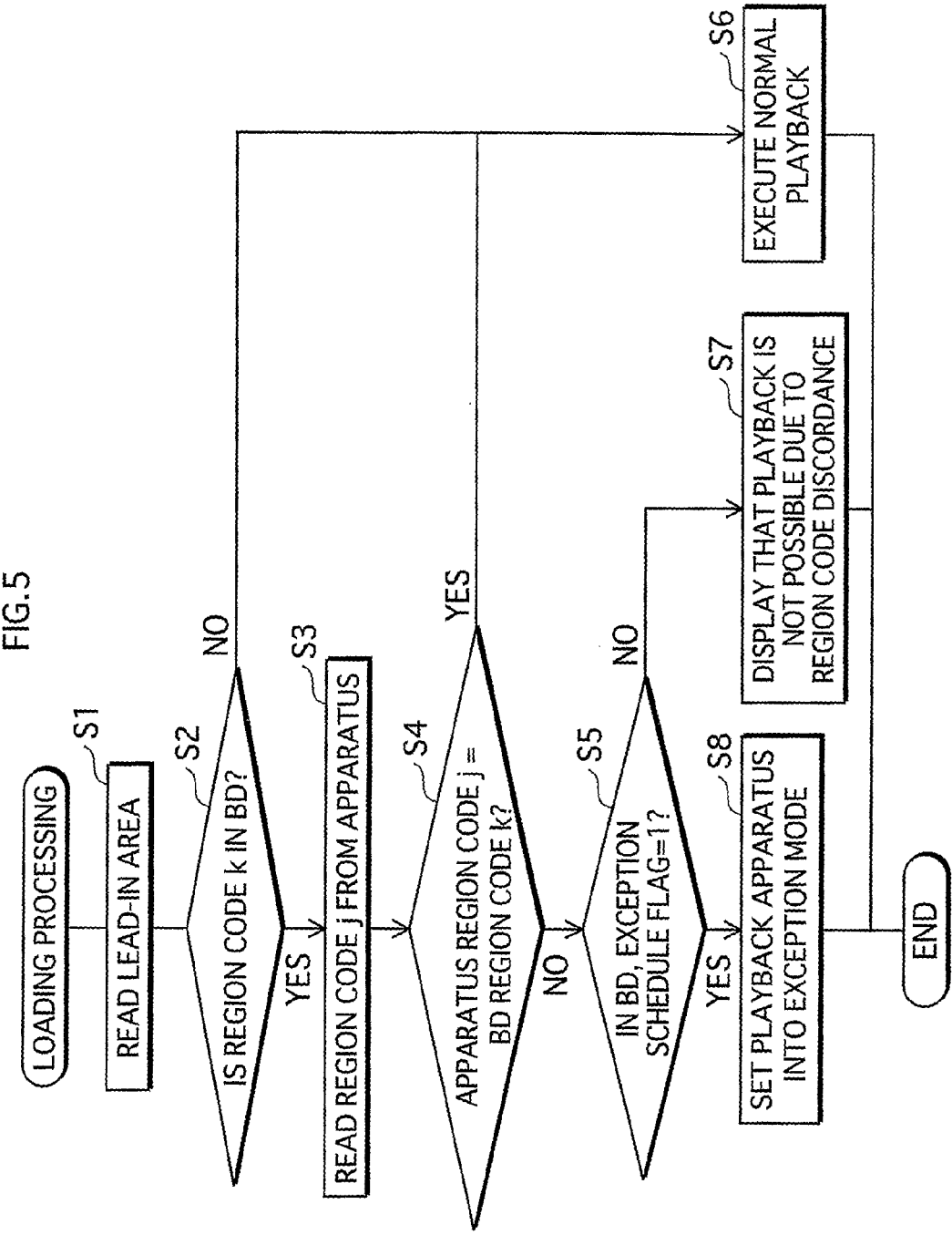
FIG. 5 is a flow chart showing the procedure of the loading processing.

FIG. 5 is a flow chart showing the procedure of the loading processing.

The loading processing is to read the lead-in area in Step S1, and to perform Steps S2 through S5 before one of the Steps S6, S7, and S8 is selectively performed.

In Step S6, the playback apparatus 200 is set into the exception mode. Step S7 is an error processing in which it is displayed that playback is not possible due to disaccord of the region codes. Step S8 is a processing for executing the normal playback.

In Steps S2 through S5, the judgment as to which one of these three kinds of processing should be executed is determined.

In Step 2, it is judged whether there is a region code on the BD. When the judgment result is "Yes" in Step S2, the region code of the playback apparatus 200 is read (Step S3). Here, the BD-ROM region code to be read will be referred to as the region code k, whereas the apparatus region code will be referred to as the region code j. In Step S4, it is judged whether the region code j matches the region code k on the BD. In this procedure, when the judgment result in Step S2 is "No", and the judgment result in Step S4 is "Yes", the processing in Step S6 will be performed. When the judgment result in Step S4 is "No", the processing in Step S5 will be performed.

In Step S5, it is judged whether the exception schedule flag on the BD is "1" or not. When the flag is "1", an error processing is performed in Step S7. When the flag is "0", the playback apparatus 200 is set into the exception mode.

Figure 6:
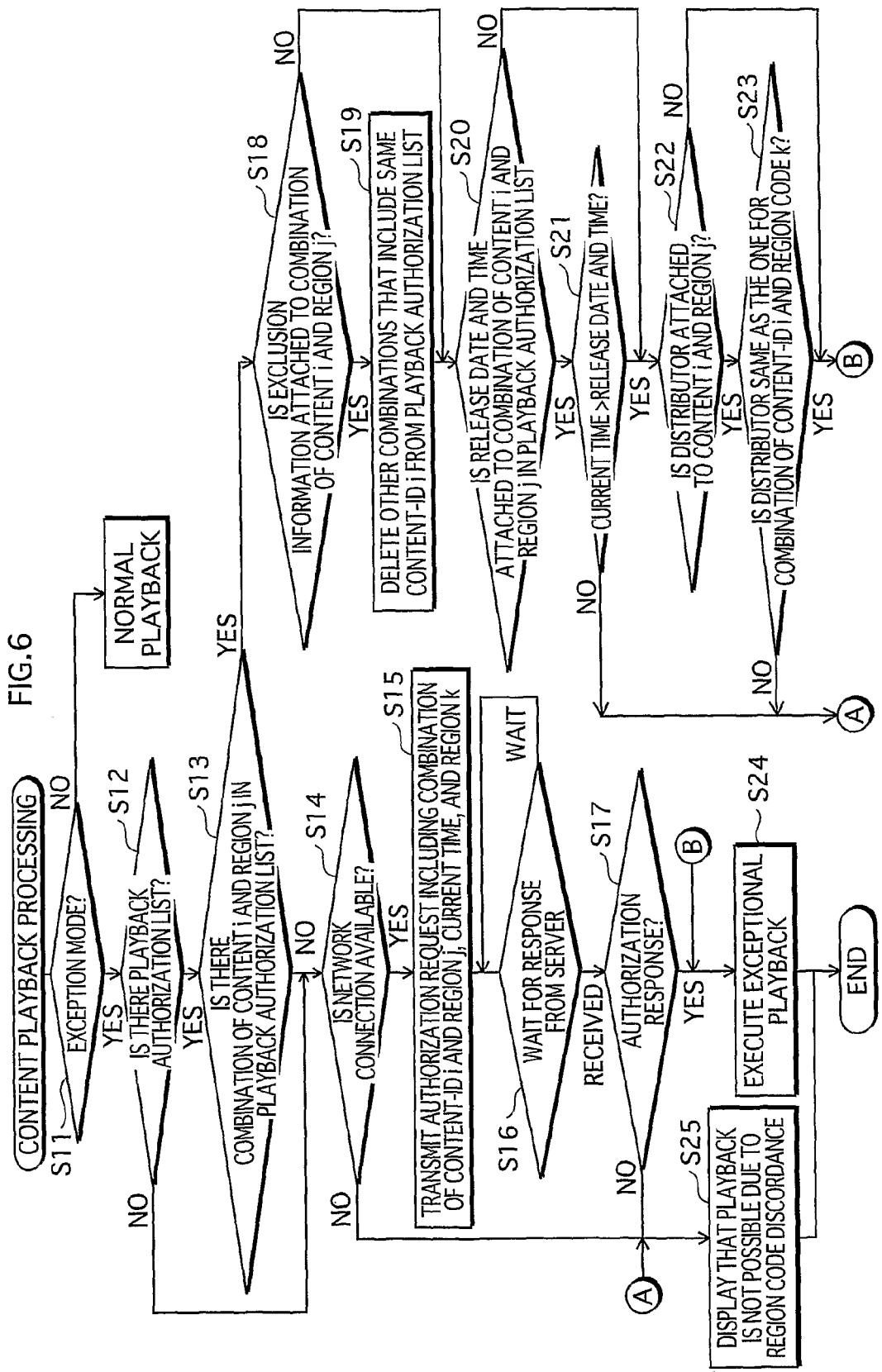
FIG. 6 is a flow chart showing the procedure of the content playback processing.

FIG. 6 is a flow chart showing the procedure of the content playback processing. In this flow chart, the content recorded on the BD-ROM 100 being a playback target will be referred to as the content i. Firstly, it is judged whether the apparatus is in the exception mode or not (Step S11). When it is not in the exception mode, the normal playback will be performed. When it is in the exception mode, either the exceptional playback will be performed (Step S24) after the processing in Steps S12 through S23, or it will be displayed that the playback is not possible due to disaccord of the region codes (Step S25).

In Step S12, it is judged whether there is a playback authorization list or not. In Step S13, it is judged whether there is a combination of the content-ID i and the region code j is included in the playback authorization list.

When the judgment result in Step S12 is "No", or when the judgment result in Step S12 is "Yes" but the judgment result in Step S13 is "No", it is judged whether an exceptional playback can be authorized or not in Steps S14 through S17. The processing in Steps S14 through S17 is a procedure performed in a case where the playback authorization server 500 makes judgment on playback authorization.

On the other hand, when the judgment result in Step S13 is "Yes", it is judged whether an exceptional playback can be authorized or not in Steps S18 through S23. The processing in Steps S18 through S23 is a procedure performed in a case where judgment on playback authorization is made according to the playback authorization list.

First, explanation is provided on the playback authorization judgment made by the playback authorization server 500. In Step S14, it is judged whether a network connection is possible or not. When the judgment result in this step is "No", an error processing is performed in Step S25.

When the judgment result in this step is "Yes", the processing in Step S15 and later will be performed.

In Step S15, an authorization request is transmitted, the authorization request including the combination of the content-ID i and the region code j, the current time, and the region code k. In Step S16, a response from the playback authorization server 500 is awaited. In Step S17, it is judged whether a response from the playback authorization server 500 is an authorization response or not. When it is an authorization response, an exceptional playback is performed in Step S24. When it is a non-authorization response, an error processing is performed in Step S25.

It should be noted that, when an authorization request is transmitted in Step S15 in FIG. 6, the current time on the playback apparatus 200 and the region code on the BD-ROM 100 are also transmitted in addition to the combination of the content-ID and the region code. It is arranged this way so that such judgments are made by the playback authorization server 500 as to (i) whether the release date of the content in the region to which the playback apparatus 200 belongs is already past and (ii) whether the distributor in the region to which the playback apparatus 200 belongs matches the distributor in the region of the BD-ROM 100.

Next, the following explains the playback authorization judgment made according to the playback authorization list.

In Step S18, it is judged whether exclusion information is attached to the combination of the content-ID i and the region code j. When a piece of exclusion information is attached, other combinations that include the same content ID i are deleted from the playback authorization list (Step S19).

In Step S20, it is judged whether a release date is attached to the combination of the content ID i and the region code j in the playback authorization list. In Step S22, it is judged whether a piece of Distribution Company information is attached to the combination of the content ID i and the region code j. When neither of these kinds of information is attached, the judgment result in Step S20 is "No", and the judgment result in Step S22 is "No", and an exceptional playback is performed in Step S24.

When one of these kinds of information is attached, the judgments in Steps S21 and S23 are made. In Step S21, it is judged whether the current time is past the release date or not. When the current time is not past the release date, the judgment result in Step S21 is "No", and an error processing is performed in Step S25.

In Step S23, it is judged whether the distributor for the combination of the content-ID i and the region code j matches the distributor for the combination of the content-ID i and the region code k. When they do not match each other, the judgment result in Step S23 is "No", and an error processing is performed in Step S25.

Figure 7:
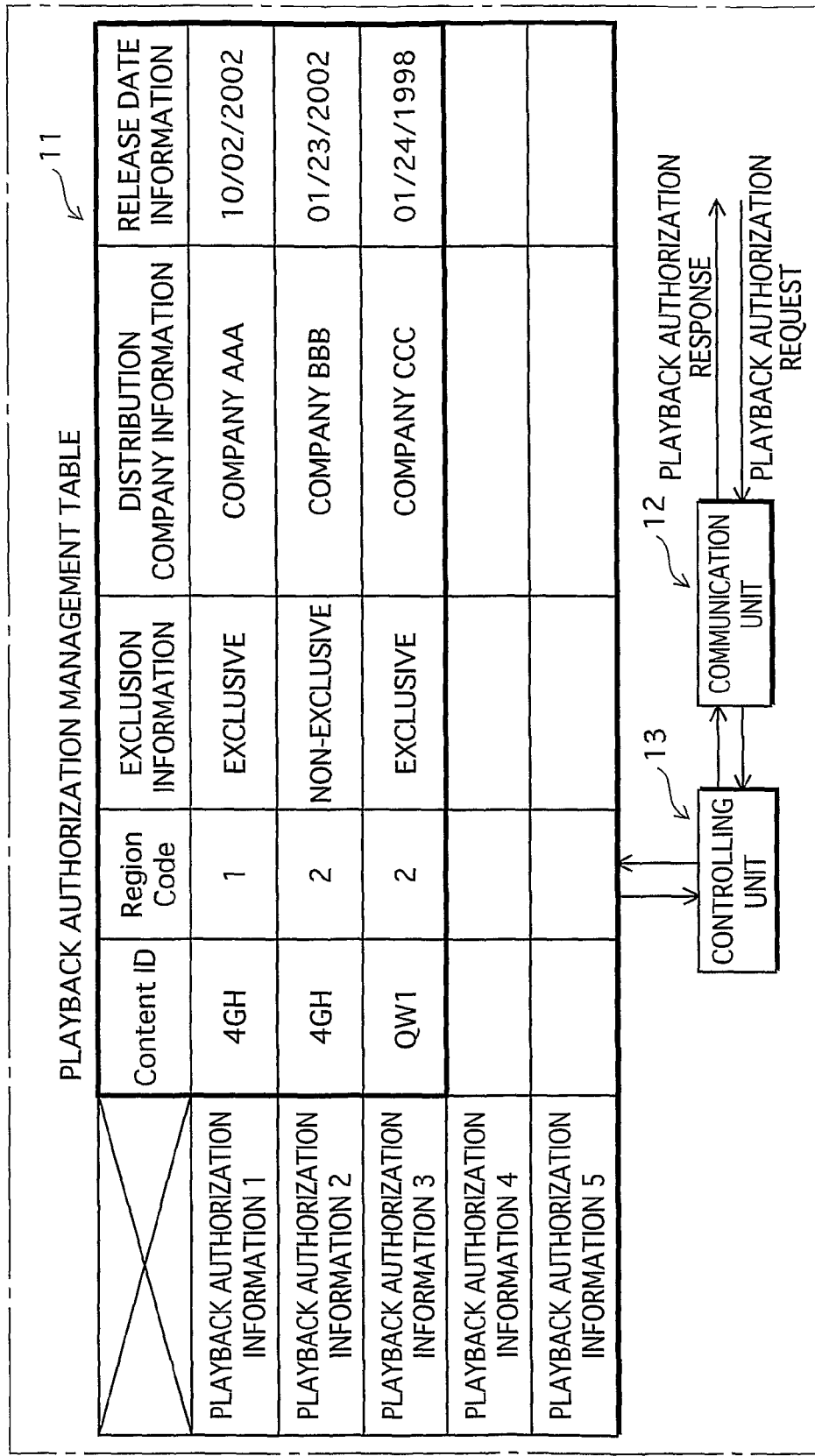
FIG. 7 shows the inside of the playback authorization server 500.

The following is explanation on the playback authorization server 500. FIG. 7 shows the inside of the playback authorization server 500. As shown in the drawing, the playback authorization server 500 includes a playback authorization management table 11, a communication unit 12, and a controlling unit 13.

The playback authorization management table 11 includes a plurality of pieces of playback authorization information, similar to that of the playback authorization list. These pieces of playback authorization information shows information on the combinations made up of each of a plurality of contents which are under the control of the copyright owner and each of a plurality of regions to be distribution target areas of movie productions. Although there is a difference in the scale of the amounts of information, the items written in the playback authorization management table 11 are not different from those written in the playback authorization list. It is fair to say that the playback authorization list in the playback apparatus 200 is part of the playback authorization management table 11 in the playback authorization server 500. Since the playback authorization list is a part of the playback authorization management table 11, it is possible for the playback apparatus 200 to request, to the playback authorization server 500, a download of the playback authorization list which is a part of the playback authorization management table 11. It would be preferable that such a download is performed based on a URL or the like recorded on the BD-ROM 100. The reason for this is that each playback authorization server 500 is run by the copyright owner of the content, and therefore playback authorization servers 500 are different from one copyright owner to another. Thus, it is preferable to uniquely specify a playback authorization server 500 on the BD-ROM 100. As for the URLs of some major copyright owners (distributors), it is acceptable to have those URLs stored in playback apparatuses 200. Alternatively, it is also acceptable to download URLs from the sites of manufacturers of playback apparatuses 200.

The communication unit 12 performs communication with the playback apparatus 200 via a network.

Figure 8:
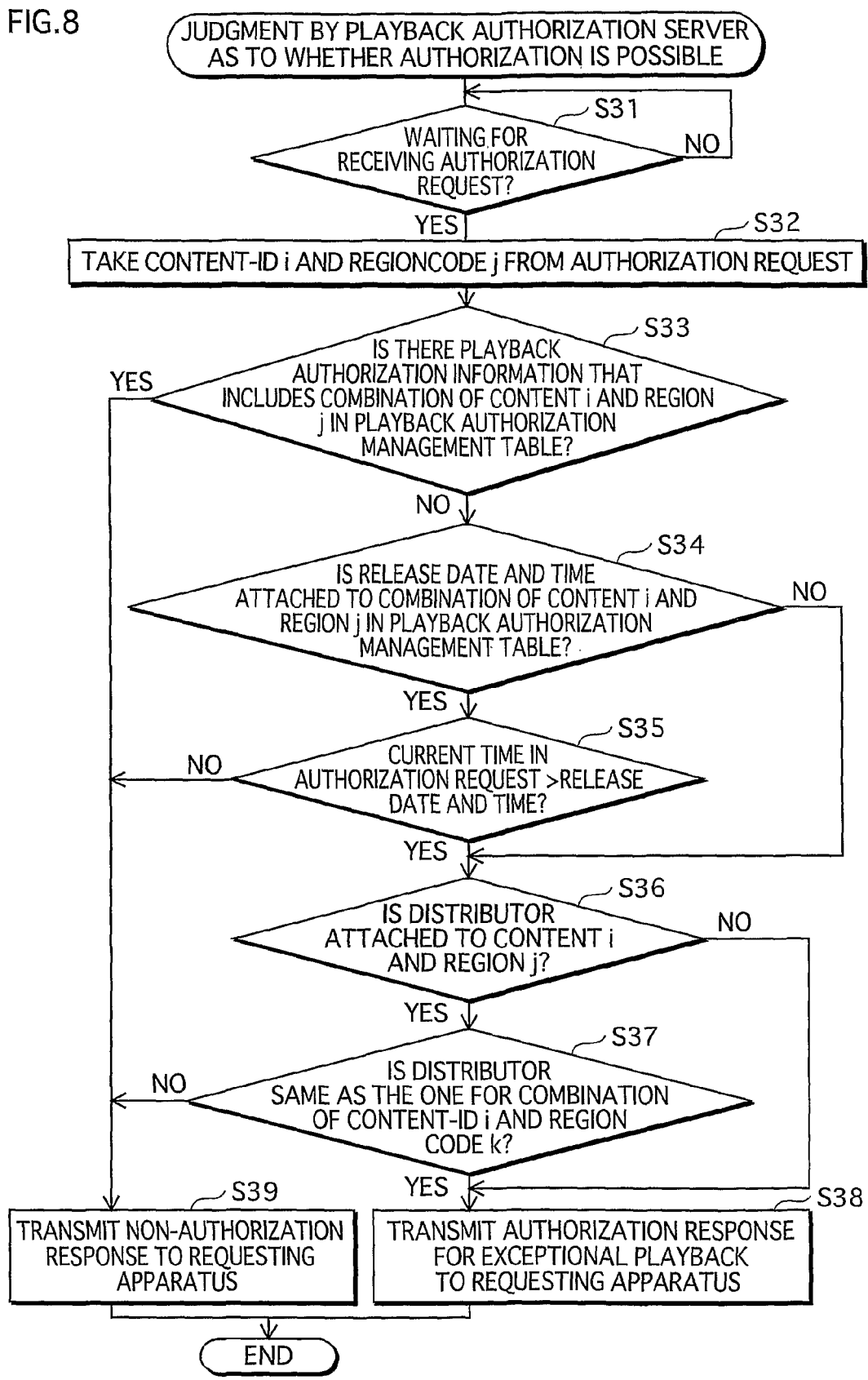
FIG. 8 is a flow chart showing the procedure of the processing by the controlling unit 13.

When an authorization request has been transmitted from the playback apparatus 200, the controlling unit 13 judges whether the authorization request will be authorized or not by referring to the playback authorization management table 11. When the request is to be authorized, an authorization response will be transmitted to the playback apparatus 200 being the source of the request. When the request is not to be authorized, a non-authorization response will be transmitted to the playback apparatus 200 being the source of the request. The controlling unit 13 is realized by writing a program that executes the flow chart shown in FIG. 8 and having the server computer execute the program. FIG. 8 is a flow chart showing the procedure of the processing by the controlling unit 13. In this flow chart, firstly receiving an authorization request is waited for in Step S31, and when an authorization request has been received, the content-ID i and the region code j are taken out from the authorization request in Step S32.

Subsequent processing performs the processing either in Step S38 or Step S39 depending on the results in Steps S33 through S37. Here, in Step S38, an authorization response for an exceptional playback is transmitted to the playback apparatus 200 being the source of the request. In Step S39, a non-authorization response is transmitted to the playback apparatus 200 being the source of the request. The processing in Steps S33 through S37 determines which one is to be executed, Step S38 or Step S39.

In Step S33, it is judged whether a piece of playback authorization information including a combination of the content-ID i and the region code j exists in the playback authorization management table 11 or not. When it does not exist in the table 11, the procedure advances to Step S39, where a non-authorization response is transmitted.

In Step S34, it is judged whether a release date is attached to the combination of the content-ID i and the region code j in the playback authorization management table 11. In Step S36, it is judged whether a piece of Distribution Company information is attached to the combination of the content-ID and the region code j. When neither of these kinds of information is attached, the judgment result in Step S34 is "No", and the judgment result in Step S36 is "No", and an authorization response for an exceptional playback is transmitted to the apparatus being the source of the request in Step S38.

When one of these kinds of information is attached, the judgments in Steps S35 and S37 are made. In Step S35, it is judged whether the current time is past the release date or not. When the current time is not past the release date, the judgment result in Step S35 is "No", and an error processing is performed in Step S39.

In Step S37, it is judged whether the distributor for the combination of the content-ID i and the region code j (the region code of the playback apparatus 200) matches the distributor for the combination of the content-ID i and the region code k (the region code on the BD-ROM 100). When they do not match each other, the judgment result in Step S37 is "No", and an error processing is performed in Step S39.

According to the present embodiment as explained above, even if the region code on the BD-ROM 100 does not match the region code of the playback apparatus 200, it is possible to play back a content in a single form when predetermined conditions are satisfied. When the playback apparatus 200 judges that some of the contents included in the collection obtained in the U.S.A. satisfy the predetermined conditions, it is possible to play them back on a playback apparatus 200 sold in Japan. When it is not desirable to allow the contents to be played back, with regard to the relationship with distribution companies in the region being the distribution target, the predetermined conditions are not satisfied. Therefore, it is possible to protect the vested interest of the distribution company in the region being the distribution target. Thus, the copyright owner is able to avoid aggravating the relationship with the distribution company in the area to which the playback apparatus 200 belongs. Further, in a case where the release periods of a content are different from one region to another in the world, it is possible to respect the release period designated to each region. Thus, the order of movie productions distribution constructed with the region code system will not be disrupted.

Second Embodiment

Figure 9A:
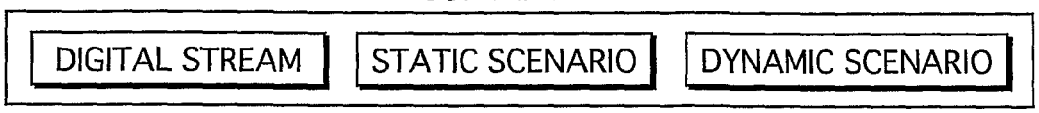
FIG. 9A shows the internal structure of a content of the embodiment.
Figure 9B:
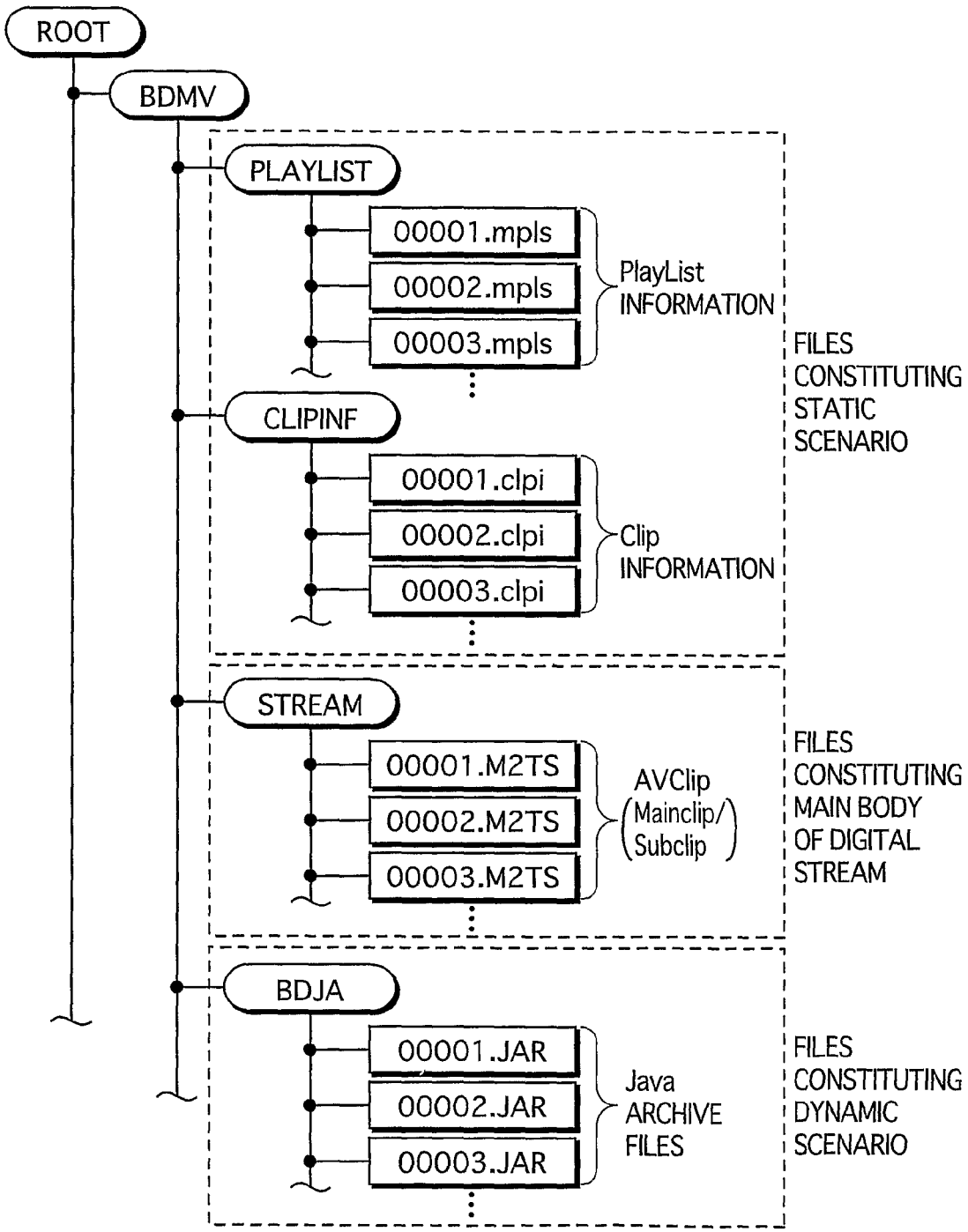
FIG. 9B represents an application format of a BD-ROM using a directory structure.

In the second embodiment, the format of a BD-ROM 100 is disclosed more in detail. FIG. 9A shows the internal structure of a content according to the present embodiment. As shown in the drawing, a content in the second embodiment is made up of the main body of a "digital stream", a "static scenario" that defines a playback path for the digital stream, and a "dynamic scenario" that indicates the dynamic playback control procedure using the playback path. FIG. 9B expresses an application format of a BD-ROM 100 using a directory structure. In this drawing, below a Root directory in the BD-ROM 100 is a BDMV directory.

Subordinate to the BDMV directory are four sub-directories called a PLAYLIST directory, a CLIPINF directory, a STREAM directory, and a BDJA directory.

The STREAM directory is a directory in which files that are the main body of the digital stream are stored. The stored files include ones that have an extension m2ts attached (00001.m2ts, 00002.m2ts, and 00003.m2ts).

The PLAYLIST directory is a directory in which files that constitute a static scenario are stored. The stored files include ones that have an extension mpls attached (00001.mpls, 00002.mpls, and 00003.mpls).

The CLIPINF directory is a directory in which files that constitute a static scenario are stored, like the PLAYLIST directory. The stored files include ones that have an extension clpi attached (00001.clpi, 00002.clpi, and 00003.clpi).

The BDJA directory is a directory in which files that constitute a dynamic scenario are stored. The stored files include ones that have an extension jar attached (00001.jar, 00002.jar, and 00003.jar).

In the drawing, each of the files to which an extension m2ts is attached (i.e. 00001.m2ts, 00002.m2ts, 00003.m2ts) stores an AVClip. AVClips are of different types such as MainClips and SubClips. A MainClip is a digital stream obtained by multiplexing a plurality of elementary streams such as a video stream, an audio stream, a presentation graphics stream (PG stream) constituting a subtitle, and an interactive graphics stream (IG stream) constituting a menu.

FIG. 10 schematically shows how an AVClip is structured.

The AVClip (middle level) is structured by converting a video stream made up of a plurality of video frames (pictures pj1, pj2, and pj3) and an audio stream made up of a plurality of audio frames (upper level 1) into a PES packet string (upper level 2), and then converting the PES packet string into TS packets (upper level 3), and likewise converting a presentation graphics stream (PG stream) for a subtitle and an interactive graphics stream (IG stream) for an interaction (lower level 1) into a PES packet string (lower level 2) and then converting the PES packet string into TS packets (lower level 3) and further multiplexing these TS packets.

A SubClip is a digital stream that corresponds to one elementary stream such as an audio stream, a graphics stream, or a text subtitle stream.

The files to each of which an extension "clpi" is attached (i.e. 00001.clpi, 00002.clpi, 00003.clpi . . . ) are pieces of management information that are in one-to-one correspondence with AVClips. Since they are pieces of management information, Clip information includes information about the encoding format of streams in the AVClip, the frame rate, the bit rate and the resolution level as well as an EP_map showing the head position of a GOP.

Figure 11:
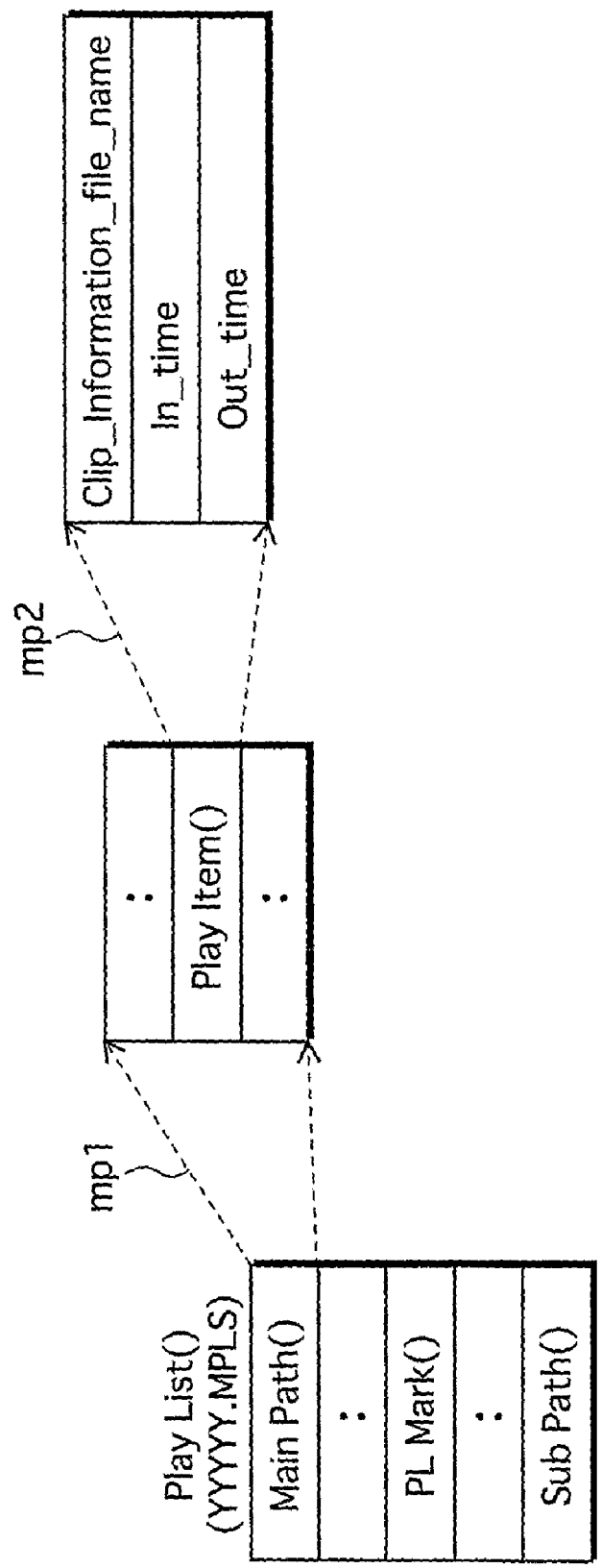
FIG. 11 shows the structure of PL information.

The files to each of which an extension "mpls" is attached (i.e. 00001.mpls, 00002.mpls, and 00003.mpls . . . ) are files in which PL information is stored. The PL information defines a playlist with reference to an AVClip. FIG. 11 shows the structure of the PL information. As shown on the left side of the drawing, the PL information is made up of "MainPath Information", "PLMark Information", and "SubPath Information".

Figure 12:
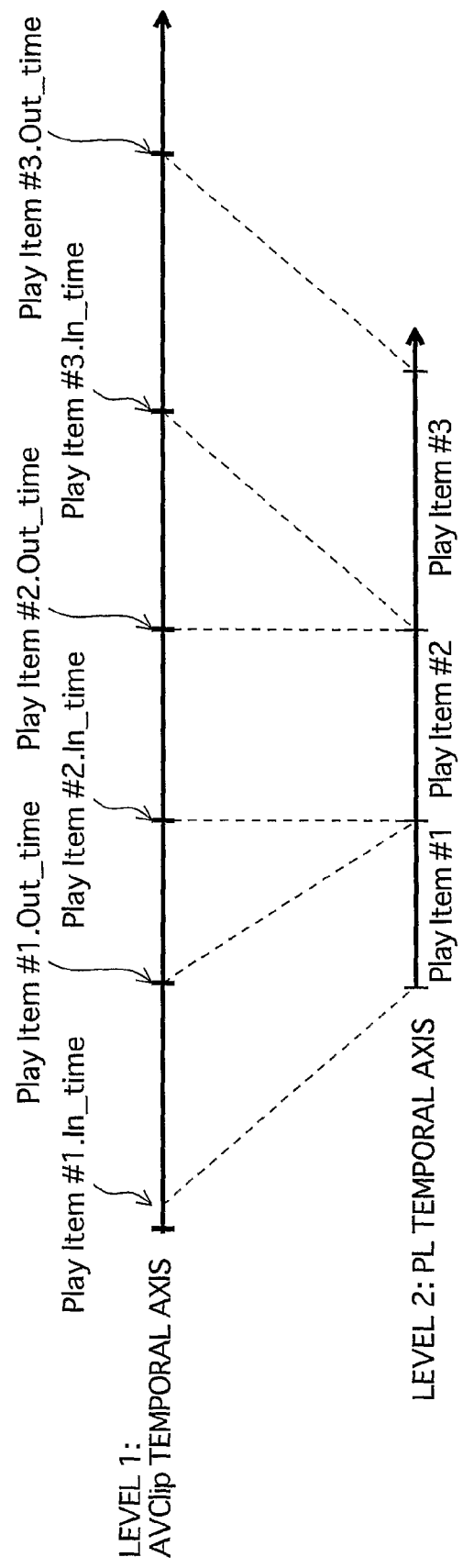
FIG. 12 shows the relationship between the AVClip temporal axis and the PL temporal axis.

As shown by an arrow with a broken line mp1, the MainPath information "MainPath( )" is made up of a plurality of pieces of PlayItem information "PlayItem( )". A PlayItem is a playback section defined by specifying an In_Time and an Out_Time on one or more AVClip temporal axes. By placing a plurality of pieces of PlayItem information, a playlist (PL) made up of a plurality of playback sections is defined. The broken line mp2 in the drawing shows a close-up of the internal structure of the PlayItem information. As shown in the drawing, the PlayItem information is made up of "Clip_information_file_name" indicating a corresponding AVClip, "In_time", and "Out_time". FIG. 12 shows the relationship between the AVClip and the PL. The level 1 shows a temporal axis that the AVClip has, and the level 2 shows a temporal axis that the PL has. The PL information includes three pieces of PlayItem information such as PlayItems #1, #2, and #3. With In_times and Out_times of these PlayItems #1, #2, and #3, three playback sections are defined. By arranging these playback sections, a temporal axis (that is different from the AVClip temporal axis) can be defined, which is the PL temporal axis shown in the level 2. As so far explained, by defining pieces of PlayItem information, it is possible to define a temporal axis that is different from that of an AVClip.

Figure 13:
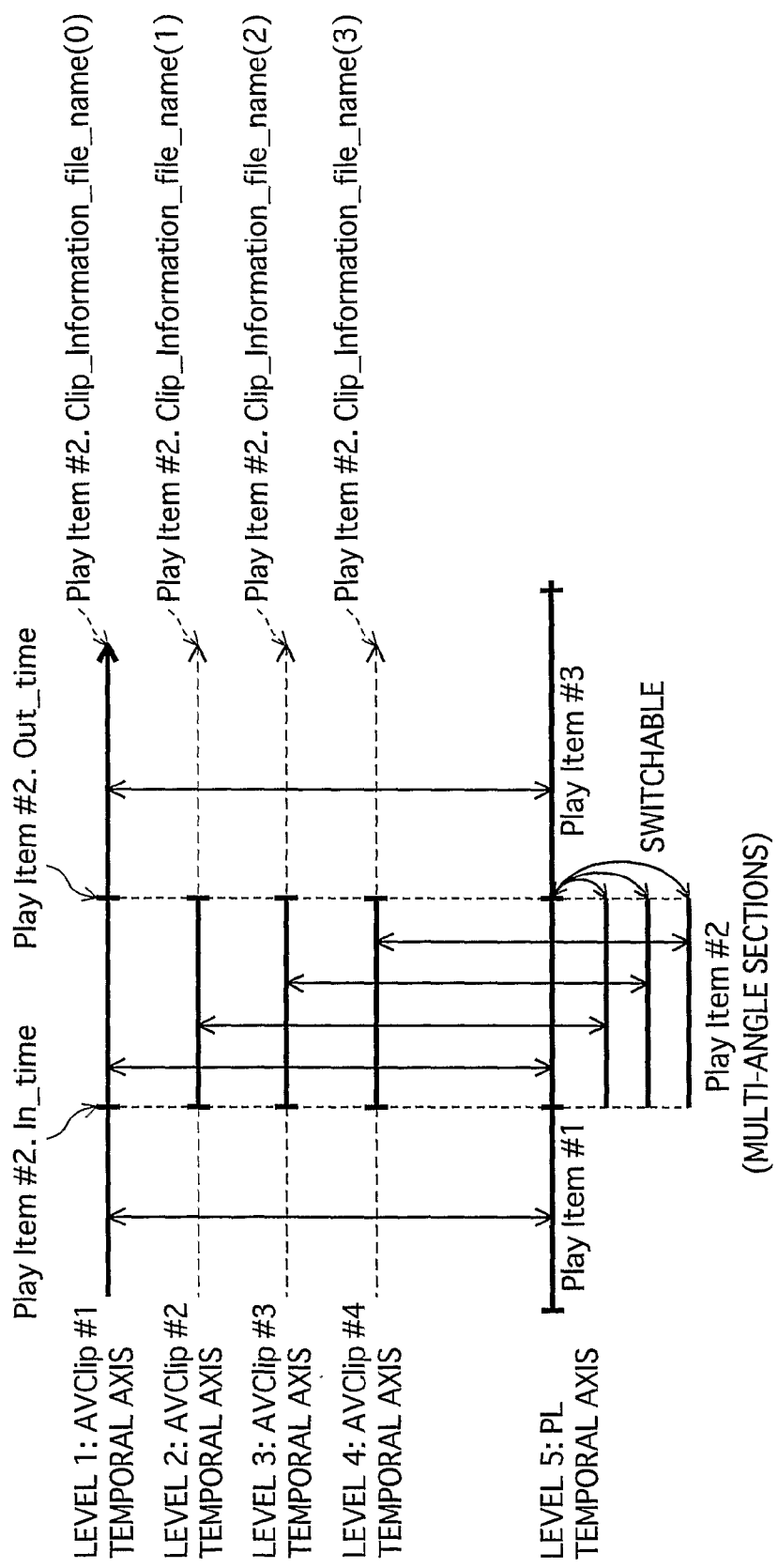
FIG. 13 shows a grouped specification made with four Clip_Information_file_names.

Specification of AVClips is in principle made for only one AVClip; however, it is also possible to specify a plurality of AVClips altogether (This kind of specification will be referred to as a "grouped specification"). A grouped specification is made with a plurality of Clip_Information_file_names in the PlayIteminformation. FIG. 13 shows a grouped specification made with four Clip_Information_file_names. In the drawing, the levels 1 through 4 show four AVClip temporal axes (i.e. temporal axes for AVClips #1, #2, #3, and #4) and the level 5 shows the PL temporal axis. These four temporal axes are specified by four Clip_Information_file_names contained in the PlayItem information. With this arrangement, four playback sections that can be selectively played back are defined by In_times and Out_times contained in PlayItem. Accordingly, on the PL temporal axis, sections (so-called multi-angle sections) are defined that are made up of a plurality of angle video images being switchable from one another.

Figure 14:
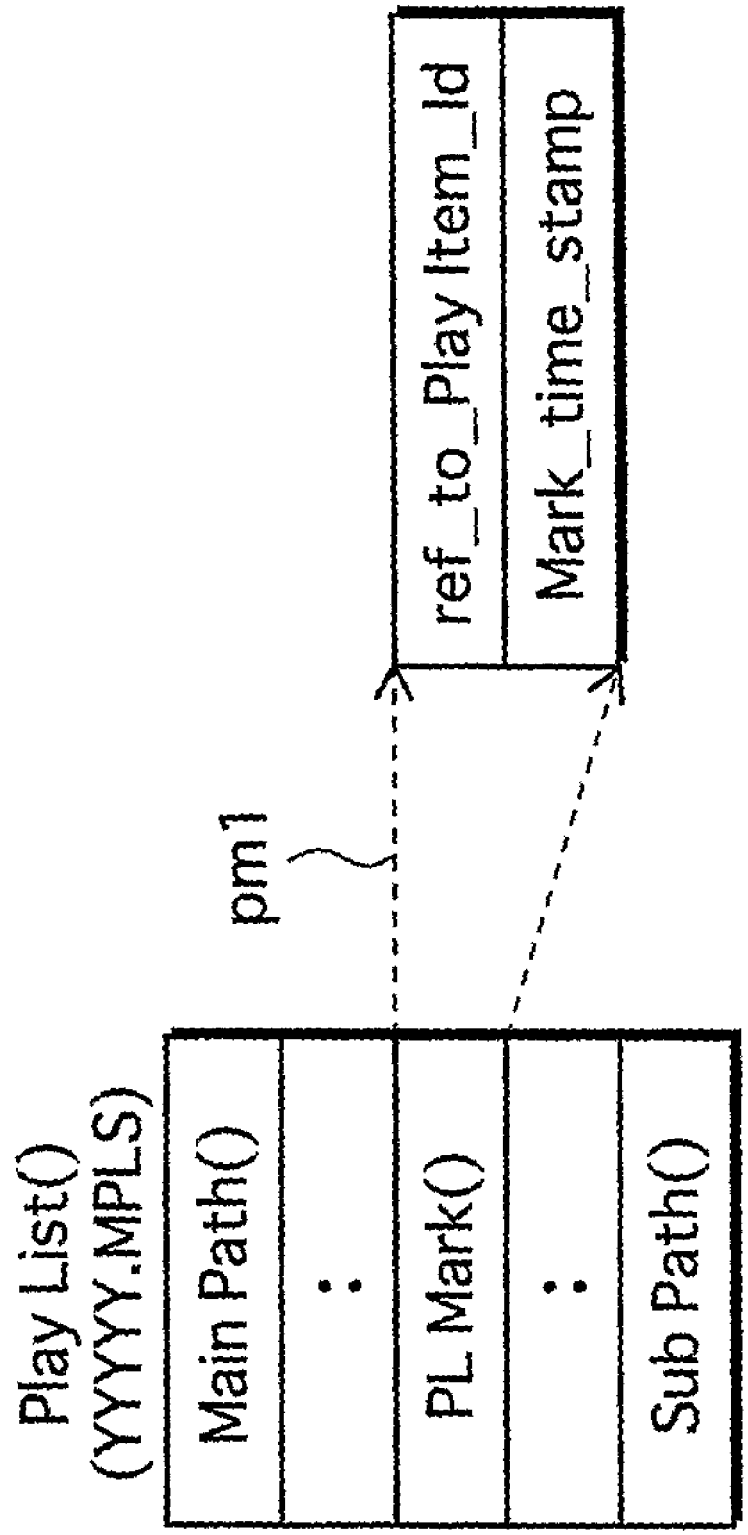
FIG. 14 shows the internal structure of PLmark Information.
Figure 15:
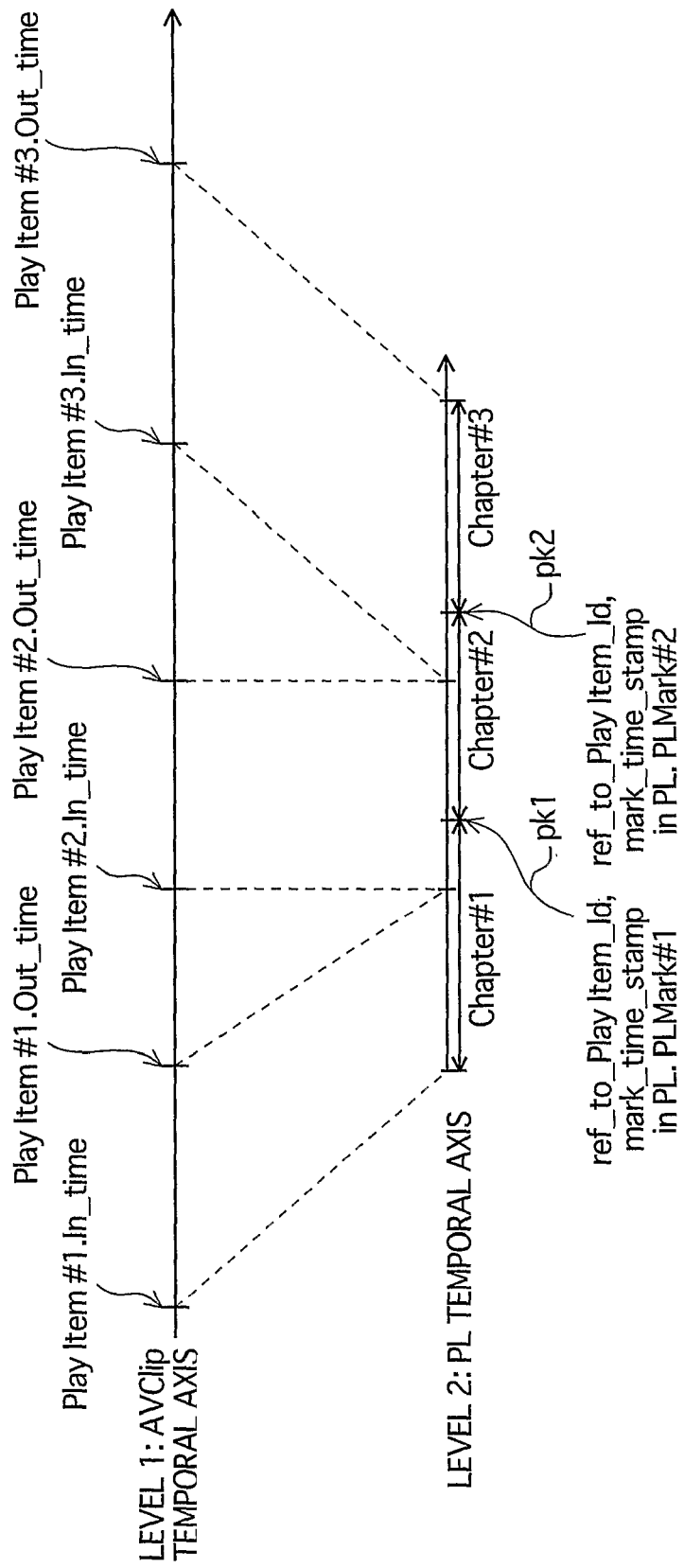
FIG. 15 shows a chapter definition with a PLmark.

The PLmark information "PLmark( )" is information for specifying an arbitrary section on the PL temporal axis as a chapter. FIG. 14 shows the internal structure of PLmark information. As indicated with the lead lines pm1 in the drawing, the PLmark information includes "ref_to_PlayItem_Id" and "Mark_time_stamp". FIG. 15 shows a chapter definition with a PLmark. In the drawing, the level 1 shows an AVClip temporal axis, and the level 2 shows the PL temporal axis. The arrows pk1 and pk2 in the drawing respectively indicate a PlayItem specification (ref_to_PlayItem_Id) and a specification of a point of time (mark_time_stamp) in PLmarks. Due to these specifications, three chapters (Chapter #1, #2, and #3) are defined on the PL temporal axis. This completes the explanation of PLmarks. The following explains the SubPath information.

Figure 16:
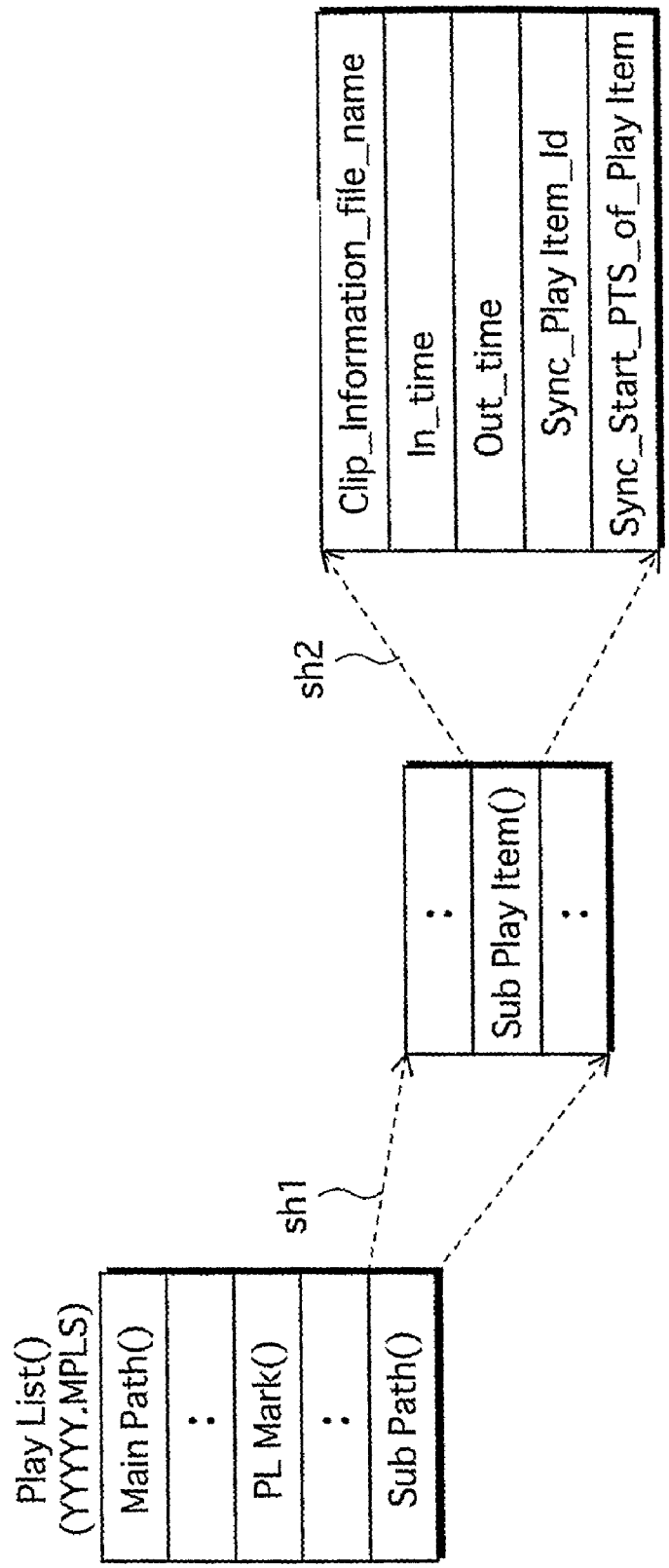
FIG. 16 shows the internal structure of SubPath information.

The SubPath information "SubPath( )" is information for defining one or more playback sections by specifying one or more sets of an In_Time and an Out_Time on a SubClip temporal axis. FIG. 16 shows the internal structure of SubPath information. As shown with the lead lines (broken lines) sh1 in the drawing, SubPath information is made up of pieces of SubPlayItem information "SubPlayItem( )" As shown as a close-up with lead lines (broken lines) sh2, the SubPlayItem information is made up of "Clip_information_file_name", "In_time", "Out_time", "Sync_PlayItem_Id", and "Sync_start_Pts_of_PlayItem". The specification of the In_Time and the Out_Time on a SubClip temporal axis is made with "Clip_Information_file_name", "In_time", and "Out_time". "Sync_PlayItem_Id", and "Sync_start_Pts_of_PlayItem". are used for a synchronization specification to have a playback section on the SubClip temporal axis synchronized with the PL temporal axis. Due to this synchronization specification, the PL temporal axis and the SubClip temporal axis progress in synchronization.

Figure 17:
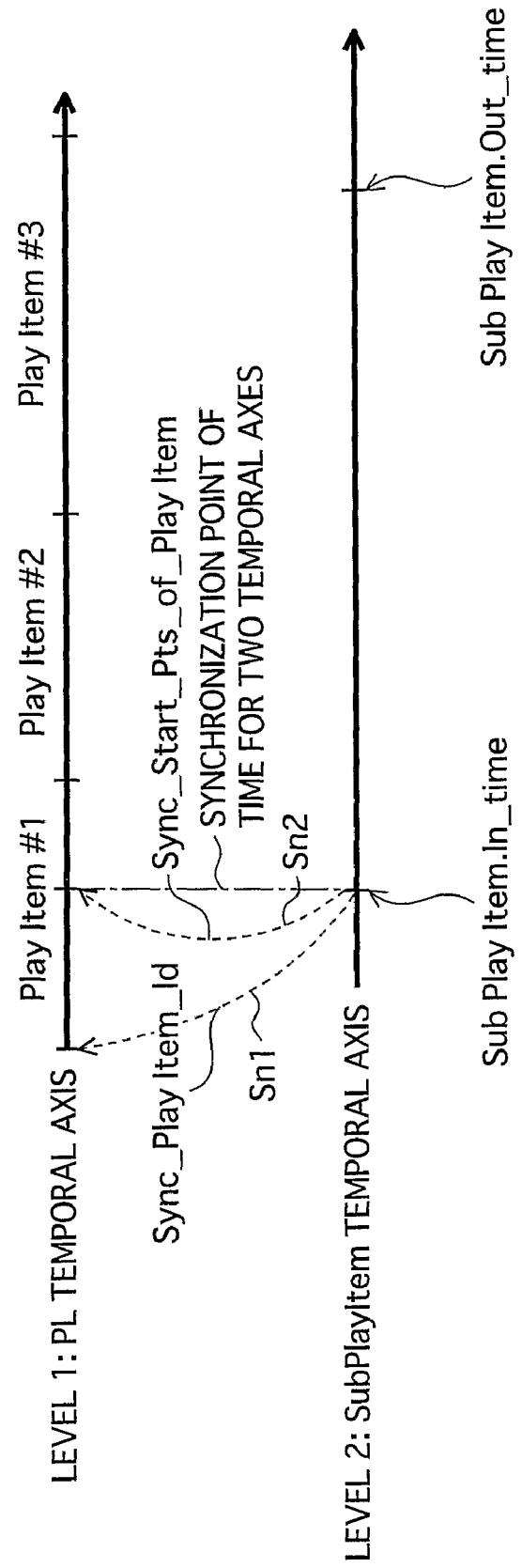
FIG. 17 shows a playback section definition and synchronization specification on the SubPlayItem temporal axis.

FIG. 17 shows a playback section definition and synchronization specification on the SubClip temporal axis. In the drawing, the level 1 shows a PL temporal axis, and the level 2 shows a SubClip temporal axis. In the drawing, SubPlayItem.In_time shows the start of a playback section, and SubPlayItem.Out_time shows the end of the playback section.

From this, it is observed that a playback section is defined also on a SubClip temporal axis. As indicated by the arrow Sn1, Sync_PlayItem_Id shows a synchronization specification for a PlayItem. As indicated by the arrow Sn2, sync_start_PTS_of_PlayItem shows a specification of a point of time in a PlayItem on the PL temporal axis.

The characteristic of PL information on BD-ROM 100 lies in that it is possible to define multi-angle sections that allow a plurality of AVClips to be switchable with one another and to define synchronization sections that allow an AVClip and a SubClip to synchronize with each other. The Clip information and the PL information described above are classified as the "static scenario".

The following describes the "dynamic scenario". The term "dynamic" means that the substance of the playback control changes as a result of a change in the status of the playback apparatus 200 or as a result of a key event from a user. On a BD-ROM 100, this kind of playback control can be described in the same manner as description of a Java Application. In other words, on a BD-ROM 100, a Java Application serves as a dynamic scenario.

The following describes a Java Application. A Java Application is made up of one or more xlet programs loaded into a heap area (also called a work memory) of a virtual machine. The application is constituted with the xlet programs loaded into the work memory and other pieces of data. This is how a Java application is constituted.

The substance of a Java Application is the Java archive files (00001.jar and 00002.jar) stored in the BDJA directory being subordinate to the BDMV directory shown in FIG. 9. In the following section, the Java archive files are described, with reference to FIG. 18.

Java ARCHIVE FILES

Figure 18A:
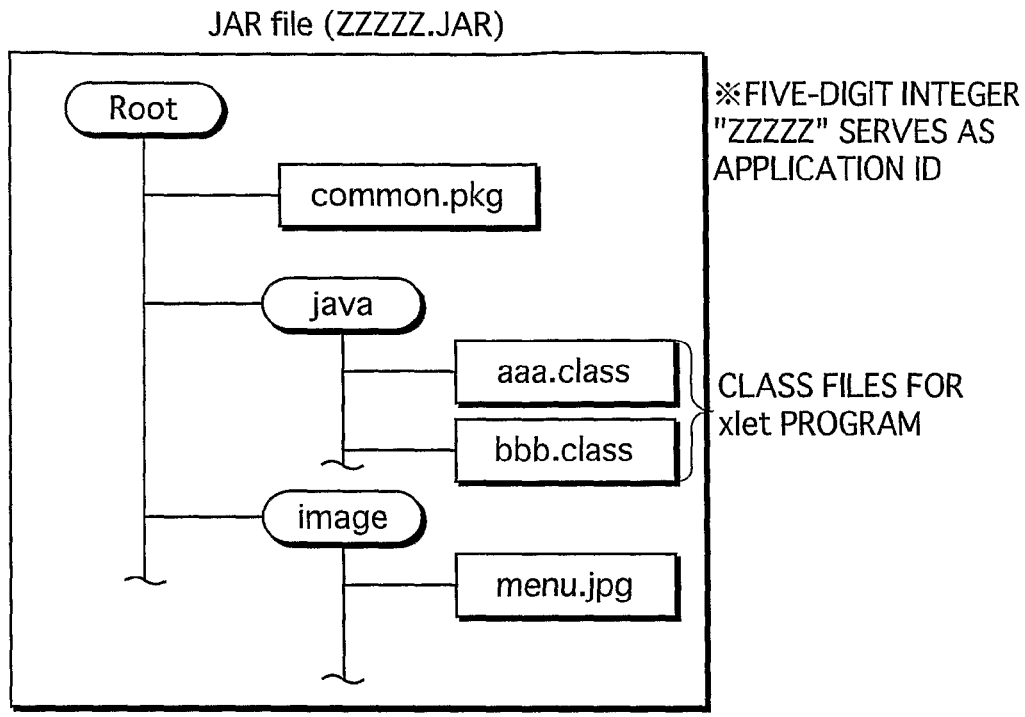
FIG. 18A shows programs and data stored in a Java archive file.

Each of the Java archive files (00001.jar and 00002.jar in FIG. 9) is a file that can be obtained by putting one or more class files and one or more data files together. FIG. 18A shows programs and pieces of data put together in an archive file. The pieces of data shown in the drawing are a plurality of files put together by a java archiver, the plurality of files having a directory structure arranged shown in the box. The directory structure shown in the box is made up of a Root directory, a java directory, and an image directory. Arranged in the Root directory is common. pkg, in the java directory are the class files (aaa.class, bbb.class), and in the image directory is menu.jpg. A java archive file is obtained by putting these together by a java archiver. These class files and pieces of data are expanded when being read from the BD-ROM 100 into a cache, and treated as a plurality of files arranged in the directory. The five-digit number "zzzzz" in a file name of a Java archive file shows the ID of an application (an application ID). When such a Java archive file is read into a cache, it is possible to take out any one of the programs and the pieces of data that constitute the Java application, by referring to the number included in a file name.

The class files shown in the drawing (aaa.class and bbb.class in the drawing) are class files that correspond to the xlet programs described above. The playback procedure in a BD-J mode is defined by the xlet programs that correspond to the instance of the class files.

An xlet program is a Java program that is able to use an interface in the JMF (Java Media Framework) format and performs processing based on a key event according to a format such as the JMF. Since an xlet program is able to perform the processing in the JMF format, an xlet program is able to instruct the playback apparatus 200 to playback a playlist by generating an instance (an JMF player instance) for an MPLS file. Besides, an xlet program is able to have some processing executed that is unique to the BD-ROM playback apparatus 200, by describing a call of a function API.

Further, an xlet program is able to execute the procedure of accessing a WWW site and downloading a content. With this arrangement, it is possible to play back a drastically new production in which a downloaded content and a played-back playlist are mixed.

Figure 18B:
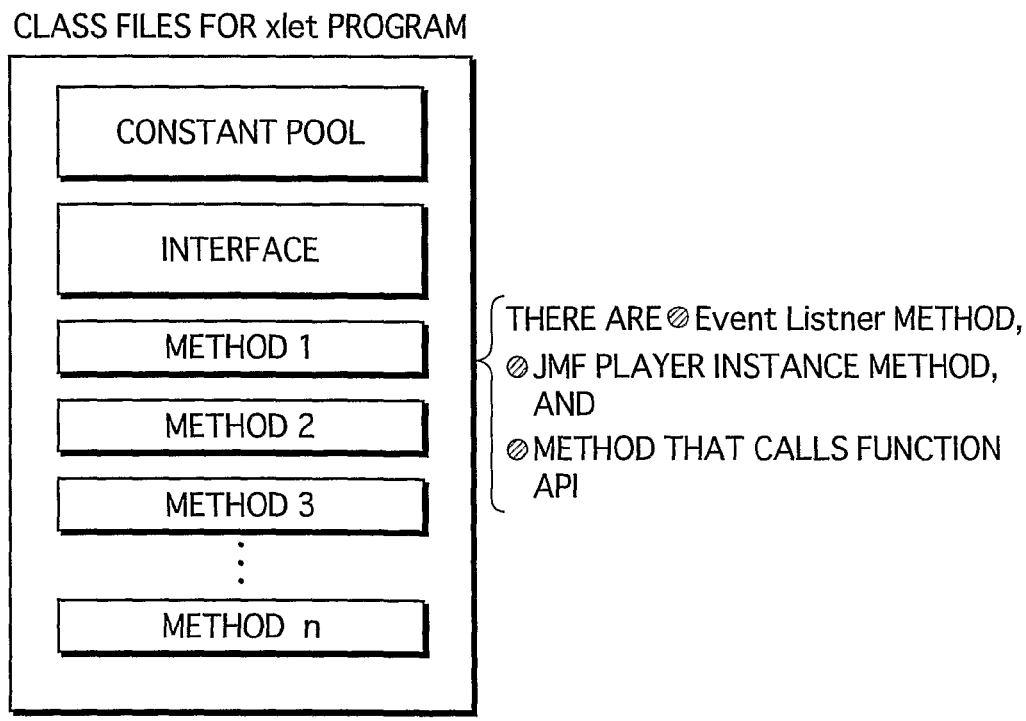
FIG. 18B shows the internal structure of a class file.

The following describes the class files in an xlet program. FIG. 18B shows the internal structure of the class files. As shown in the drawing, the class files are made up of, like normal class files, "constant pool", "interface", and "methods 1,2,3, . . . n". The methods in the class files include a method (EventListner) in which a key event to trigger a behavior is registered in advance, a method (JMF player instance method) that instructs the playback procedure of JMF and a method that calls a function API on the BD-ROM playback apparatus 200 side. In each of these methods, the procedures for calculations and the like are described with the use of local variables assigned to the method and arguments for calling the method. This completes the description of the Java archive files.

The Java application in the BD-J mode has been described so far. The combination of the Java application, the static scenario, and the digital streams illustrated in the drawing corresponds to a content in the present embodiment.

The following describes the playback apparatus 200 according to the second embodiment.

Figure 19:
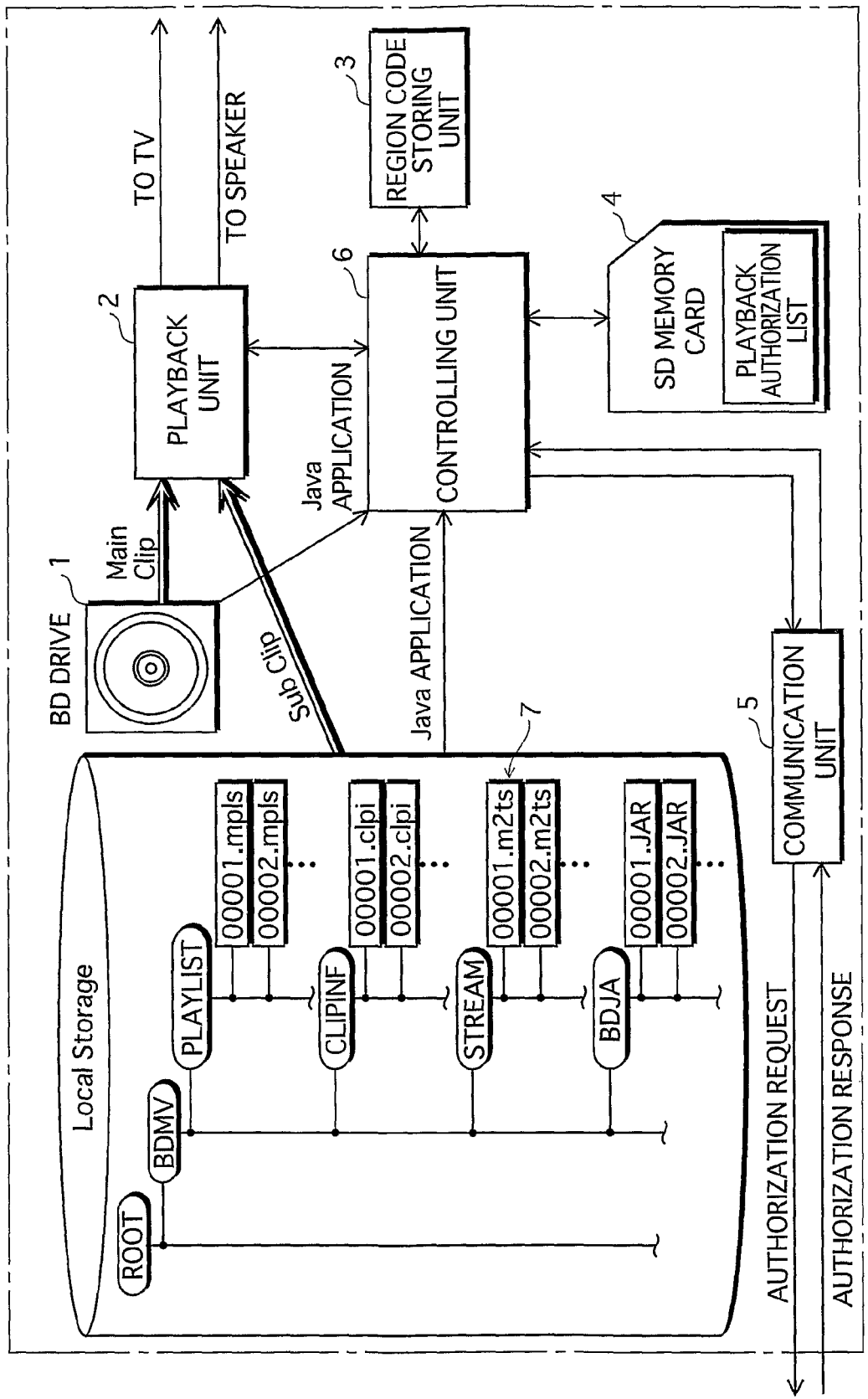
FIG. 19 shows the internal structure of the playback apparatus 200 of the second embodiment.

FIG. 19 shows the internal structure of the playback apparatus 200 according to the second embodiment. The drawing is different from the one for the first embodiment in that the local storage 7 is added.

The local storage 7 is a built-in medium that stores therein SubClip information, Clip information, PL information, and Java archive files that have been downloaded via a network or the like.

The following describes PL information in the local storage 7. The PL information in the local storage 7 is different from the PL information on a BD-ROM in that it is able to specify either of Clip information on a BD-ROM 100 and Clip information in the local storage 7. When making such a specification, the PL information in the local storage 7 does not need to specify a file on a BD-ROM 100 with a full path. The reason is because the local storage 7 is, together with a BD-ROM 100, recognized by the playback apparatus 200 as one virtual drive (called a virtual package). Thus, Clip_Information_file_name in the PlayItem information and Clip_Information_file_name in the SubPlayItem information are able to specify an AVClip either on a BD-ROM 100 or in the storage 7, by specifying a five-digit number which corresponds to the file body of a file that stores Clip information. It is possible to generate variations of playback of different kinds, by reading what is recorded in the local storage 7 and dynamically combining it with what is recorded on a BD-ROM 100.

Figure 20:
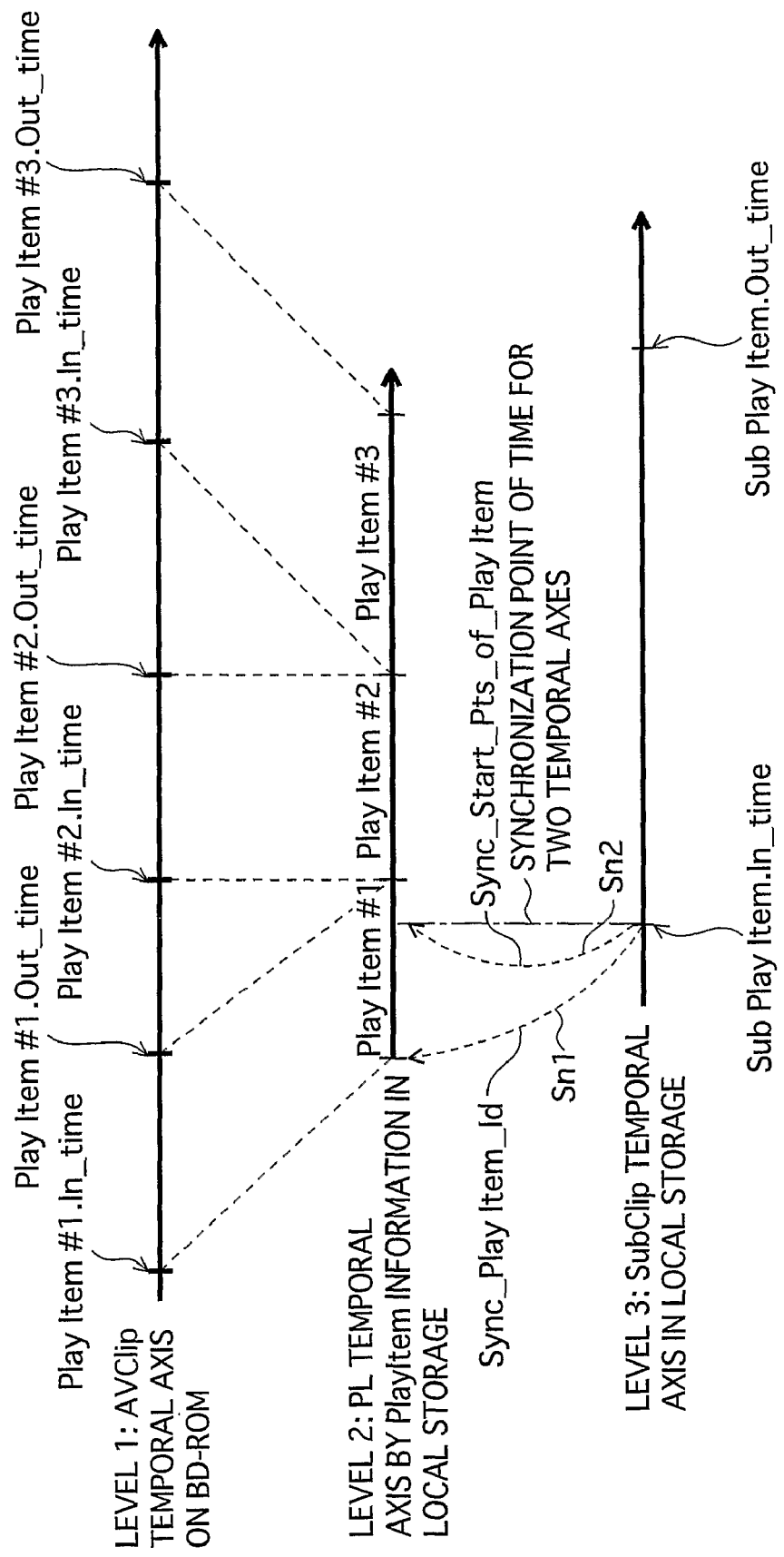
FIG. 20 shows what kind of PlayList playback temporal axis is defined by PL information stored in the local storage.

FIG. 20 shows what kind of PlayList playback temporal axis is defined by PL information stored in the local storage. The level 1 shows a playback temporal axis in an AVClip recorded on a BD-ROM 100. The level 2 shows a PlayList playback temporal axis defined by PL information stored in the local storage. As shown in the levels 1 and 2, the PL information stored in the local storage is able to define a playback temporal axis of its own for the AVClip on the BD-ROM 100. The level 3 shows a SubClip playback temporal axis in a SubClip stored in the local storage. In the drawing, SubPlayItem.In_time shows the start of a playback section, and SubPlayItem.Out_time shows the end of the playback section. From this, it is observed that a playback section is defined also on a SubClip temporal axis. As indicated by the arrow Sn1, Sync_PlayItem_Id shows a synchronization specification for a PlayItem. As indicated by the arrow Sn2, sync_start_PTS_of_PlayItem shows a specification of a point of time in a PlayItem on the PL temporal axis.

Due to this, the playback section defined on the SubClip playback temporal axis by the SubPlayItem information is synchronized with the PlayList playback temporal axis defined by the PlayItem information in the local storage.

The PL information in the local storage is able to specify a PlayList playback temporal axis for the AVClip on the BD-ROM 100. The SubPlayItem information in the local storage is able to specify, on the playback temporal axis, synchronization with the SubClip in the local storage; therefore, in the case where the SubClip in the local storage is a text subtitle stream, it is possible to play back the text subtitle stream in synchronization with the AVClip on the BD-ROM 100.

Figure 21:
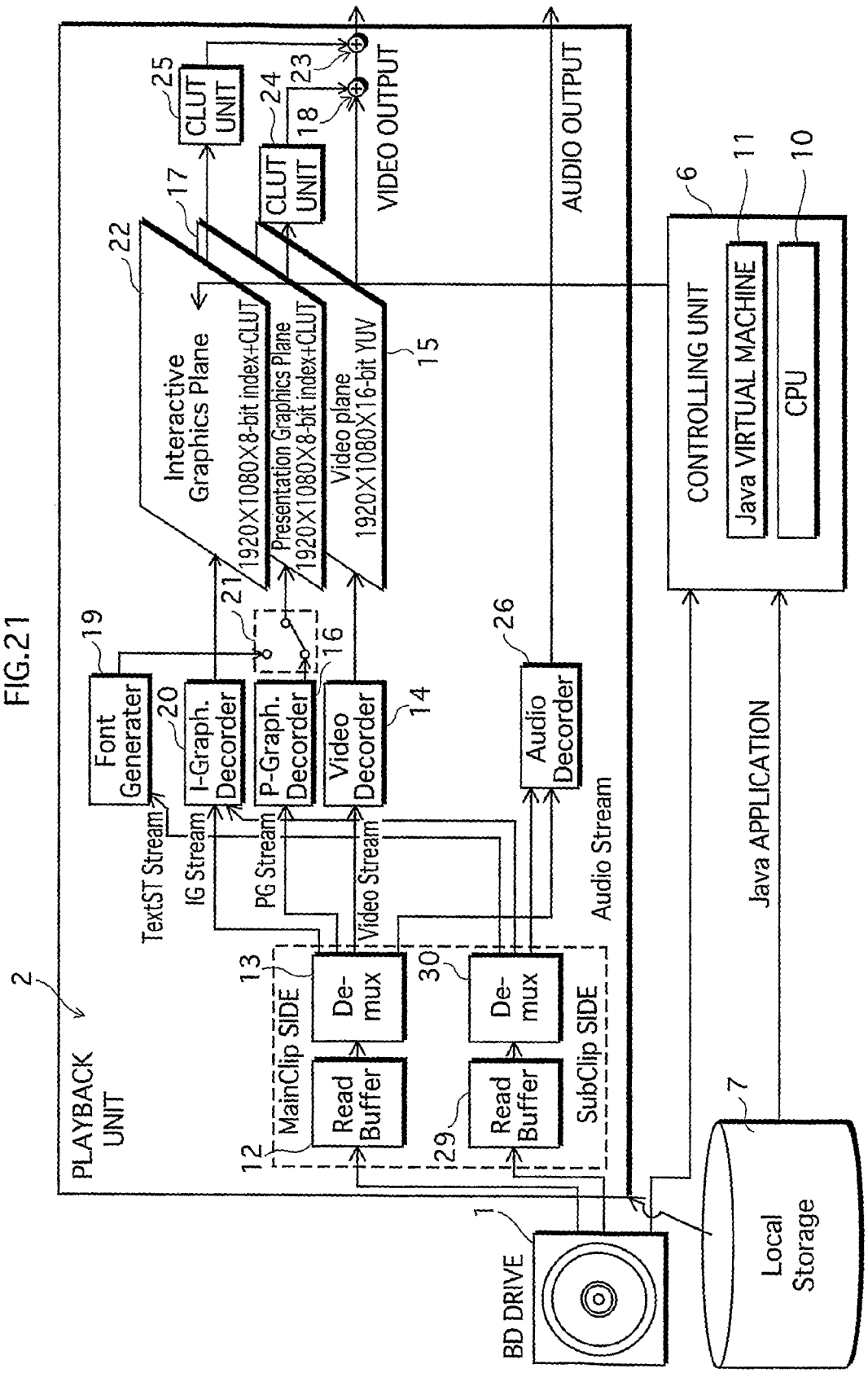
FIG. 21 shows the internal structures of the controlling unit 6 and the playback unit 2.

FIG. 21 shows the internal structure of the controlling unit 6 and the playback unit 2.

The controlling unit 6 is made up of the CPU 10 and the Java virtual machine 11. The Java virtual machine 11 converts the byte codes constituting a Java application into native codes and issues them to the CPU 10. As a result of this conversion, the Java application is to be executed.

As shown in the drawing, the playback unit 2 is made up of the read buffer 12, the demultiplexer 13, the video decoder 14, the video plane 15, the P-graphics decoder 16, the Presentation Graphics plane 17, the synthesizing unit 18, the font generator 19, the I-Graphics decoder 20, the switch 21, the Interactive Graphics plane 22, the synthesizing unit 23, the CLUT unit 24, the CLUT unit 25, the audio decoder 26, the read buffer 29, and the demultiplexer (De-MUX) 30.

The read buffer 12 is a FIFO memory, and TS packets read from a BD-ROM 100 are stored in a first-in-first-out manner.

The demultiplexer (De-MUX) 13 takes TS packets out of the read buffer 12 and converts the TS packets into PES packets. The PES packets obtained as a result of the conversion are outputted to one of the video decoder 14, the P-Graphics decoder 16, the I-Graphics decoder 20, and the audio decoder 26.

The video decoder 14 decodes the plurality of PES packets outputted from the demultiplexer 3 so as to obtain pictures in an uncompressed format and writes the pictures into the video plane 15.

The video plane 15 is a plane for storing pictures in an uncompressed format. A plane is a memory area for storing pieces of pixel data for one screen of image in a playback apparatus 200. The resolution of the video plane 15 is 1920× 1080. The pieces picture data stored in the video plane 15 are made up of pieces of pixel data expressed with 16-bit YUV values.

The P-Graphics decoder 16 decodes the presentation graphics stream read from a BD-ROM 100 and writes uncompressed graphics into the Presentation Graphics plane 17. As a result of the decoding of the graphics stream, subtitles appear on the screen.

The Presentation Graphics Plane 17 is a memory that has an area for one screen of image and is able to store uncompressed graphics for one screen of image. The resolution of this plane is 1920×1080. The pixels of the uncompressed graphics in the Presentation Graphics plane 17 are expressed with 8-bit index colors. As a result of converting these index colors with the use of a CLUT (Color Lookup Table), the uncompressed graphics stored in the Presentation Graphics plane 17 serve to be displayed.

The synthesizing unit 18 synthesizes the picture data (i) which is stored in the video plane 15 and is in an uncompressed state with what is stored in the Presentation Graphics plane 17.

The font generator 19 expands the text codes included in a text ST stream into a bitmap with the use of character fonts and writes them into the Presentation Graphics Plane 17.

The I-Graphics decoder 20 decodes the IG stream read from either a BD-ROM 100 or the local storage 7 and writes the uncompressed graphics into the Interactive Graphics plane 22.

The switch 21 is a switch that selectively writes, into the Presentation Graphics plane 17, one of the font sequence generated by the font generator 19 and the graphics obtained as a result of the decoding performed by the P-Graphics decoder 16.

Into the Interactive Graphics plane 22, uncompressed graphics obtained as a result of the decoding performed by the I-Graphics decoder 20 are written. Also, characters and graphics generated by the Java application are also written.

The synthesizing unit 23 synthesizes what is stored in the Interactive Graphics plane 22 with the synthesized image (the picture data in an uncompressed state synthesized with what is stored in the Presentation Graphics plane 17) outputted from the synthesizing unit 18. As a result of the synthesis, the characters and the graphics written into the I-Graphics decoder 20 by the application can be displayed as an overlay over the picture data in the uncompressed state.

The CLUT unit 24 converts the index colors in the uncompressed graphics stored in the video plane 15 into the values of Y, Cr, and Cb.

The CLUT unit 25 converts the index colors in the uncompressed graphics stored in the Interactive Graphics plane 22 into the values of Y, Cr, and Cb.

The audio decoder 26 decodes the PES packets outputted from the demultiplexer 3 and outputs audio data in an uncompressed format.

The read buffer 29 is a FIFO memory and in the case where the downloaded content stored in the local storage 7 includes a SubClip, the TS packets that constitute this SubClip are stored into the read buffer 29 in a first-in-first-out manner.

The demultiplexer (De-MUX) 30 takes TS packets out of the read buffer 29 and converts the TS packets into PES packets. Among the PES packets obtained as a result of the conversion, a PES packet that has a desired PID is outputted to the font generator 19, the I-Graphics decoder 20, and the audio decoder 26. This completes the description for FIG. 21.

FIG. 22 shows what kind of subtitle display is available from PlayList information and SubPlayItem information in the local storage 7. In the case where the presentation graphics stream multiplexed on the AVClip on the BD-ROM side is the one for displaying an English subtitle, the playback shown on the left side of FIG. 22 is achieved. Specifically, playback is achieved with an English line "He had a person at one's nod". Alternatively, in the case where the SubPlay Item information on the local storage 7 side defines synchronization with a text subtitle stream for displaying a Japanese subtitle, the playback shown on the right side of FIG. 22 is achieved. Specifically, playback is achieved with the dubbed audio in Japanese "Kare wa hito o ago de tsukatte iru." In the case where a SubClip and PL information both exist in the local storage 7, it is possible to playback a content using a subtitle which does not exist on the BD-ROM 100.

The following describes a Java application defined by a Java archive file in the local storage 7. The Java application defined by a Java archive file in the local storage 7 is able to specify the PL information to be played back, regardless of whether the PL information exists on the BD-ROM 100 or in the local storage 7.

In the following sections, explanation is provided in comparison on what kinds of playback are achieved with a Java application recorded on a BD-ROM 100 and a Java application defined by a Java archive file in the local storage 7.

Figure 23A:
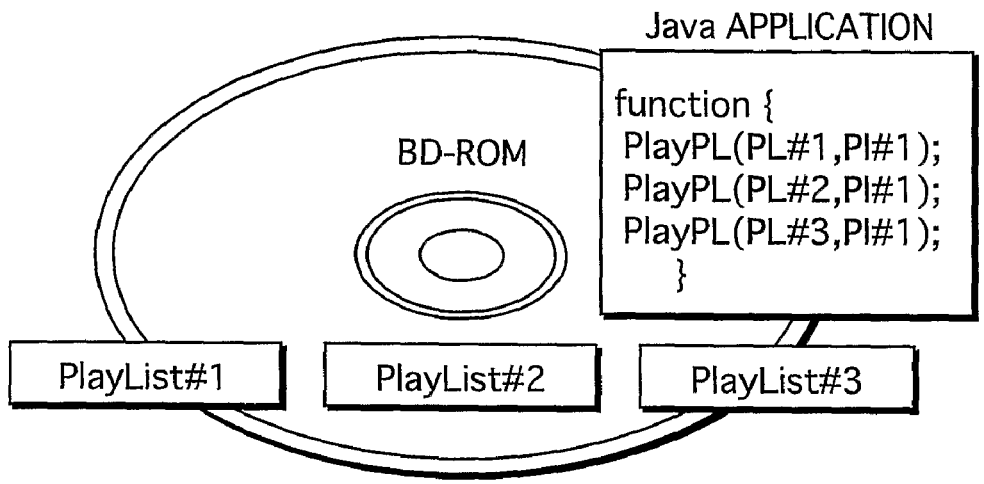
FIG. 23A shows an example of Java application.

FIG. 23A shows an example of a Java application on the BD-ROM 100. In this example, three function calls such as PlayPL(PL#1, PI#1), PlayPL(PL#2, PI#1), and PlayPL (PL#3, PI#1) are arranged in a row; therefore, three PLs such as PL#1, PL#2, and PL#3 are sequentially played back so as to constitute a movie production.

Figure 23B:
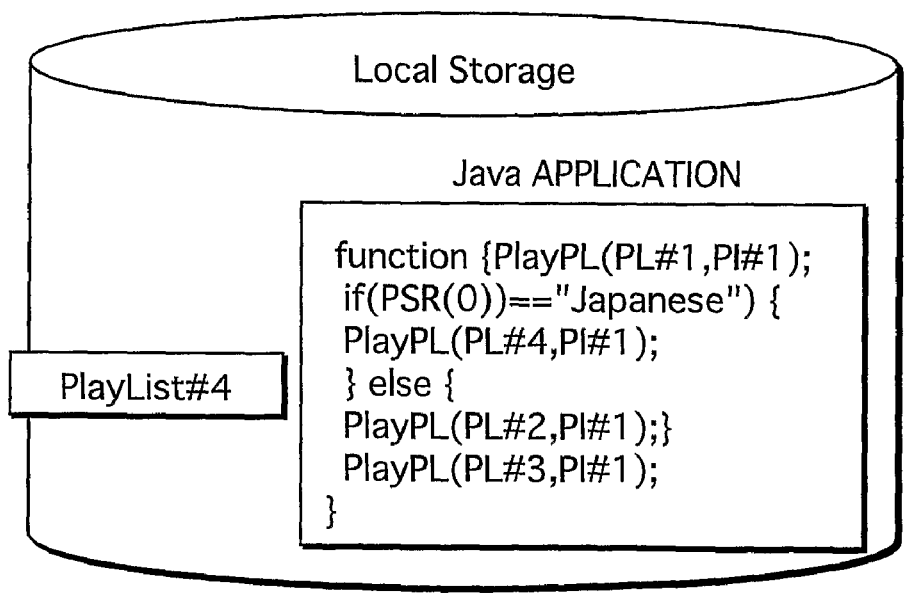
FIG. 23B shows a dynamic scenario used in place of the Java application shown in FIG. 23A.

FIG. 23B shows an example of a Java application defined by a Java archive file on the local storage 7 side. This Java application exists in the local storage 7. This Java application realizes the "language credit" which is to switch playback scenes depending on the language and includes an additional PL, that is PL#4. This is a substitute image and is played back alternatively in place of PL#2.

The Java application on the local storage 7 side realizes conditional playback which is to playback PL#4 (Link (PL#4, PI#1, 0)), if the language setting (PSR (0)) on the playback apparatus 200 is "Japanese" (if(PSR(0)==Japanese)), and to playback PL #2 (Link(PL#2, PI#1)) if the language setting on the playback apparatus 200 is some other language (else).

Figure 24A:
FIG. 24A shows the playback procedure by a Java application recorded on a BD-ROM.
Figure 24B:
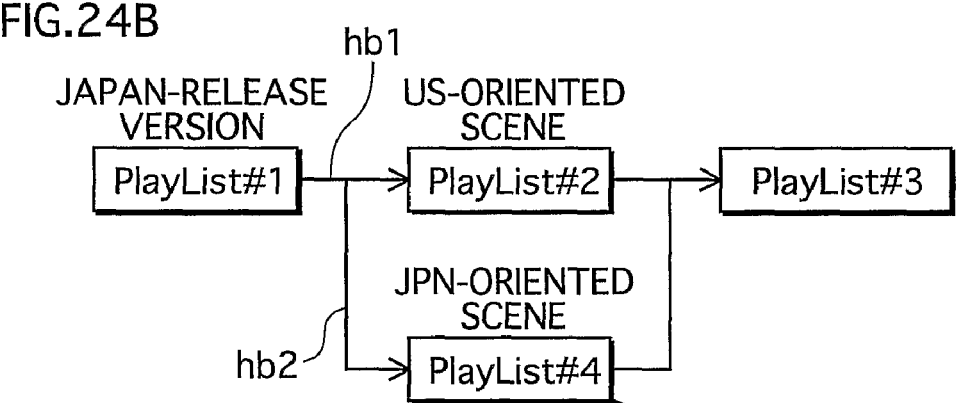
FIG. 24B shows the playback procedure by a Java application.

FIG. 24A shows the playback procedure by a Java application recorded on a BD-ROM 100. FIG. 24B shows the playback procedure by a Java application on the local storage 7 side. The arrows hb1 and hb2 in FIG. 24B symbolically shows conditional branching by the Java application on the local storage 7 side.

As apparent from the drawings, the Java application recorded on the BD-ROM 100 merely sequentially plays back the PLs #1, #2, and #3 recorded on the BD-ROM 100. On the other hand, the Java application on the local storage 7 side switches between the playback of the PL for Japan (PL#4) and the playback of the PL for the U.S.A. (PL#2), depending on the value of PSR (0). This is realization of the language credit. When the status setting of the playback apparatus 200 is set as the minimum user age to be able to view the content, it is possible to realize a parental control which is to switch the PlayList to be played back depending on the minimum user age.

As explained so far, according to the present embodiment, when an exceptional playback is performed in the case where region codes do not match, the playback apparatus 200 downloads a subtitle or a Java application that is suitable for the region to which the playback apparatus 200 belongs and performs playback with the use of the downloaded subtitle or Java application. Therefore, the user is able to view the content with a subtitle or a Java application that suits the language of the region in which the user lives.

Third Embodiment

In the first embodiment, the playback apparatus 200 transmits an authorization request that includes a combination to the playback authorization server 500 so that the playback authorization server 500 transmits, in response to the request, a list to the playback apparatus 200 being the source of the request. In contrast, in the second embodiment, after an authorization request that includes a combination is transmitted, a search is made to find the country or region to which the playback apparatus 200 being the source of the request belongs, using the region code included in the authorization request as a clue, so that a management server that manages the region provides services that are suitable for the country or region to which the playback apparatus 200 being the source of the request belongs.

Here, the services provided by a management server is to transmit, to the requester, a text subtitle that is suitable for the country or region or to transmit a Java application for selecting scenes that are in conformity with the country or region.

FIG. 25 shows the structures of the playback authorization server 500 and the management servers 601 to 606 according to the second embodiment. As shown in the drawing, the management servers 601, 602, and 603 to 606 exist in the network. These management servers manage a plurality of countries and regions in the world. Each of the management servers has a management region indicated with a region code. For example: Japan is managed by the management server 601; the U.S.A. is managed by the management server 602; and the U. K. is managed by the management server 603. The playback authorization server 500 searches for one of the management servers that manages the playback apparatus 200 being the source of the request, using the region code indicated in the authorization request as a clue, and has the management server found in the search provide services that are suitable for the region. The §1, §2, and §3 schematically depict a playback authorization request by the playback apparatus 200 (§1), a transmission request to the management server determined by the region j (§2), and the downloads of a text subtitle and a Java application performed by the management server (§3).

As explained so far, according to the present embodiment, when an exceptional playback is performed in the case where region codes do not match, the playback authorization server 500 transmits, as the local storage 7, a Java application that executes the playback control procedure being suitable for the region to which the playback apparatus 200 belongs and has the playback apparatus 200 perform playback using the local storage 7. Therefore, the user is able to view a content through a playback path that is suitable for the language of the region in which the user lives.

Fourth Embodiment

In the first embodiment, the content ID is recorded on the BD-ROM 100; however, the fourth embodiment is related to an improvement by which contents IDs of contents are stored in a Data Base (DB) server that is different from the playback authorization server 500 so that the playback apparatus 200 takes out the content IDs if necessary. FIG. 26 shows the DB server 700 according to the fourth embodiment. The DB server 700 shown in the drawing stores therein the content IDs as pieces of meta data (META DATA 1, 2, and 3) for the movie productions, the pieces of meta data each including the names of the performers and the creators for the content and so on. The playback apparatus 200 according to the present embodiment accesses the DB server 700 when making an authorization request and downloads one of the pieces of meta data stored in the DB server 700 for which the playback apparatus 200 should request a playback authorization. When making such a request, the playback apparatus 200 transmits a part of the images in the content or the sound print of the audio (wavelengths of the sound etc.) to the DB server 700 and notifies the DB server 700 that the playback apparatus 200 legitimately owns the content. When it has been proved by the part of the images, the sound print of the audio, or the like, that the content is owned by the playback apparatus 200 being the source of the request, the DB server 700 transmits a piece of meta data that includes a content ID to the playback apparatus 200 being the source of the request. §1, §2, §3, and §4 in the drawing schematically depict the notification of legitimate ownership by a touch-panel-type remote controller 200 (§1), the transmission, performed by the DB server 700, of a piece of meta data that includes a content ID (§2), the transmission of a playback authorization request that includes a combination of a content ID and a region code (§3), and the transmission, performed by the DB server 700, of a playback authorization list (§4).

As explained so far, according to the present embodiment, since a content ID is obtained from the DB server, it is possible to update the content ID managed by the DB server when the need of an update arises on the creator side; therefore it is possible to provide information with realtime-ness. Further, since information on the performers and the like is transmitted along with a content ID, it is possible to constantly keep such information updated.

Supplementary Information

The above description by no means shows the implementation of all configurations of the present invention. Implementation of the present invention is still possible according to implementation of configurations that carry out the following modifications (A), (B), (C), and so on. It should be noted, however, that other concrete examples that are included in the invention pertaining to the claims and are at a level that can be executed with technical knowledge from this specification and the drawings or technical knowledge of one of ordinary skill in the art at the time the application is filed are omitted.

(A) The Distribution Company information, the exclusion information and the Release Date information included in the playback authorization information of the first embodiment, as well as Steps S18 to S23 in the flow chart shown in FIG. 6 are elements the addition of which are optional. It is acceptable to make judgment of playback authorization without using these. In other words, it is acceptable to arrange so that the predetermined condition is that the combination of the content i and the region code j exists among the combinations in the playback authorization information, and when this condition is satisfied, an authorization for playback is given.

(B) It is arranged so that the region code is written in the lead-in area of a BD-ROM 100 because compatibility with a DVD is concerned. Therefore, the region code may be written in any other place. Alternatively, it is also acceptable when no region code is attached to the BD-ROM 100.

(C) The description is merely optional as to handling a Title as one content, and providing a content ID for an index of a Title in the Index Table. Any units of playback on a BD-ROM 100 could be taken as contents. It is acceptable to attach a content ID to an AVClip itself. Alternatively, it is also acceptable to attach a content ID to the PL information.

(D) It is acceptable to write a sales price of the content in a region to which the playback apparatus 200 belongs so as to be included in the playback authorization information so that an exceptional playback is performed when the bill is paid. The price may be a difference amount from the sales price in a region in which the BD-ROM 100 is sold.

(E) When the BD-ROM 100 being the target of playback is a hybrid disk on which a plurality of contents are recorded, it is acceptable to generate playback authorization information so that only part of the recorded contents are allowed to be played back. With this arrangement, it is possible to record contents that can be distributed in different regions on one BD-ROM 100. Accordingly, it is possible to allow different contents to be played back depending on which region the playback apparatus 200 belongs to.

(F) In all of the embodiments, an optical disk pertaining to the present invention is implemented as a BD-ROM 100. However, the characteristics of the invention are not dependent on the physical properties of a BD-ROM 100. Any form of recording media is applicable. For example, optical disks such as DVD-ROM, DVD-RAM, DVD-RW, DVD-R, DVD+RW, DVD+R, CD-R, CD-RW, and the like, and optical-magnetic disks such as PD, MO and the like are applicable. Semiconductor memory cards such as compact flash cards, Smart Media, Memory Sticks, MultiMedia Cards, and PCM-CIA Cards and the like are also applicable, as are (i) magnetic recording disks such as flexible disks, SuperDisk, Zip, Clik! and the like, and (ii) removable hard disk drives such as ORB, Jaz, SparQ, SyJet, EZFlyer, microdrive and the like. Furthermore, the recording medium may also be a built-in hard disk.

(G) Although the playback apparatuses 200 in all of the embodiments output AVClips recorded on a BD-ROM 100 to a TV after decoding, the playback apparatus 200 may be structured from only a BD-ROM drive, and the TV may be equipped with all of the other elements. In this case, the playback apparatus 200 and the TV can be incorporated into a home network connected using IEEE1394. Also, although the playback apparatuses 200 in the embodiments are of a type used after connecting to a television, integral display-playback apparatuses 200 are also applicable. Furthermore, the playback apparatus 200 may be only those parts of the playback apparatuses 200 of the embodiments that perform essential parts of the processing. Because these playback apparatuses 200 are all inventions disclosed in the specification of the present application, acts involving the manufacture of playback apparatuses 200 based on an internal structure of the playback apparatuses 200 shown in the first through fourth embodiments are implementations of the inventions disclosed in the specification of the present application. Acts that involve transferring, whether onerous or gratuitous, (retail when cost is involved; a gift when no cost is involved), lending, or importing of playback apparatuses 200 shown in the first through fourth embodiments are also implementations of the present invention. Acts that involve approaching the general user about transfer, rental or the like by means of store front displays, catalogue solicitation, pamphlet distribution and the like are also implementations of these playback apparatuses 200.

(H) Because of the information processing by computer programs shown in FIGS. 5, 6, and 8 being realized specifically using hardware resources, computer programs showing the processing procedures in the flowcharts form an invention in their own right. Although all of the embodiments show embodiments that relate to the implementation of computer programs pertaining to the present invention in an incorporated form in the playback apparatuses 200, the computer programs shown in the embodiments may be implemented in their own right, separate from the playback apparatuses 200. The implementation of the computer programs in there own right includes acts that involve: (1) production of the programs, (2) transference of the programs, either onerous or gratuitous (3) lending of the programs, (4) importing of the programs, (5) providing the programs publicly via bi-directional electronic communications circuits, and (6) approaching the general user about transfer, rental and the like by means of store front displays, catalogue solicitation, pamphlet distribution, and so forth.

(I) When recording on a BD-ROM 100, extension headers preferably are appended to TS packets structuring AVClips. The extension headers, which are called TP_extra_header, include an "Arrival_Time_Stamp" and a "copy_permission_indicator", and have a 4-byte data length. TP_extra_header-attached TS packets (hereinafter, abbreviated to "EX-attached TS packet") are arranged into groups of 32 packets, and written into three sectors. Each group comprising 32 EX-attached TS packets is 6,144 bytes in length (=32×192), and matches the 6,144-byte size of three sectors (=2048×3). The grouping of 32 EX-attached TS packets contained in three sectors is referred to as an "Aligned Unit".

A playback apparatus 200 transmits Aligned Units in transmission processing as described below, when used in a home network connected via IEEE1394. That is, a device on the side of the sender removes the TP_extra_header from each of the 32 EX-attached TS packets included in an Aligned Unit, and outputs the TS packets after encoding the TS packet body based on a DTCP standard. When outputting TS packets, isochronous packets are inserted at various positions between TS packets. The positioning of isochronous packets is based on times shown in the Arrival_Time_Stamp in each TP_extra_header. Playback apparatus 200 outputs a DTCP_Descriptor when outputting the TS packets. The DTCP_Descriptor shows a copy permissibility setting in each TP_extra_header. Here, if the DTCP_Descriptor is described so as to show "copy prohibited", TS packets will not be recorded on other devices when used in a home network connected via IEEE1394.

(J) Although digital streams recorded on a recording medium in the embodiments are AVClips, the digital streams may be VOBs (Video Objects) complying with a DVD-Video standard or a DVD-Video Recording standard. VOBs are program streams compliant with ISO/IEC13818-1 obtained by multiplexing video and audio streams. Also, video streams in AVClips may be MPEG-4 format, WMV format, or the like. Furthermore, audio streams may be a Linear-PCM format, Dolby-AC3 format, MP3 format, or MPEG-AAC format.

(K) Video works in the embodiments may be obtained by encoding analog video signals broadcasted by analog broadcast, or may be stream data constituted from transport streams broadcasted by digital broadcast.

Also, contents may be obtained by encoding analog/digital video signals recorded on videotape. Furthermore, contents may be obtained by encoding analog/digital video signals taken directly from a video camera. Alternatively, the contents may be digital copyrighted works distributed from a distribution server.

The playback apparatus of the present invention may be used for personal purposes such as a use in a home theater system. The internal configurations of the present invention, however, are disclosed in the embodiments described above; therefore, since mass production based on the internal configurations is possible, the present invention may be industrially used with necessary resources. Thus, the playback apparatus of the present invention has industrial applicability.

The invention claimed is:

1. A system comprising:
an optical disc having a disc region code assigned thereto and having content and a content identifier identifying the content recorded thereon; and
a playback apparatus for playing back the optical disc, wherein the playback apparatus comprises:
a control unit programmed to judge whether the disc region code assigned to the optical disc matches an apparatus region code assigned to the playback apparatus; and
a playback unit programmed to play back the content when the control unit judges that the disc region code matches the apparatus region code,
wherein, the control unit is programmed such that, when the control unit judges that the disc region code does not match the apparatus region code, the control unit judges whether a combination of the content identifier and the apparatus region code satisfies a predetermined condition defined by an owner of rights of the content, wherein, the playback unit is programmed such that, when the control unit judges that the combination of the content identifier and the apparatus region code satisfies the predetermined condition defined by the owner of the rights of the content, the playback unit plays back the content recorded on the optical disc, wherein, the playback unit is programmed such that, when the control unit judges that the combination of the content identifier and the apparatus region code does not satisfy the predetermined condition defined by the owner of the rights of the content, the playback unit does not play back the content, wherein the playback apparatus further comprises a transmitting unit programmed to transmit an authorization request to a server apparatus on a network of an external system, the authorization request indicating the combination of the content identifier and the apparatus region code, wherein the server apparatus is programmed to transmit an authorization response when, based on the authorization request, the server apparatus has determined that the combination of the content identifier and the apparatus region code satisfies the predetermined condition, and wherein the server apparatus is programmed to transmit a non-authorization response when, based on the authorization request, the server apparatus has determined that the combination of the content identifier and the apparatus code does not satisfy the predetermined condition.

2. The system of claim 1, wherein:

the server apparatus includes a playback authorization list including combinations of a content identifier and a region code, each of the combinations indicating that a content identified by a respective content identifier is allowed to be played back in a region identified by a respective region code; and the control unit is further programmed to determine that the predetermined condition is satisfied when the playback authorization list of the server apparatus includes the combination of the content identifier and the apparatus region code indicated by the authorization request transmitted by the transmitting unit of the playback apparatus.

3. The system of claim 1, wherein:

the server apparatus includes a plurality of pieces of date/time information, each of the plurality of pieces of date/time information indicating, for a corresponding combination of a content identifier and a region code, a release date/time of a content identified by the content identifier for a region identified by the region code of the corresponding combination;

the authorization request transmitted from the transmitting unit of the playback apparatus to the server apparatus includes a combination of (i) a current time in a region to which the playback apparatus belongs, (ii) the content identifier of the content to be played back, and (iii) the apparatus region code; and the control unit is further programmed to determine that the predetermined condition is satisfied when the current time included in the authorization request is past the release date/time indicated in a piece of date/time information for a corresponding combination of the content identifier and the region code that is the same as the combination of the content identifier and the region code included in the authorization request.

4. The system apparatus of claim 1, wherein:

the server apparatus includes a plurality of pieces of distributor information, each of the plurality of pieces of distributor information indicating, for a corresponding combination of a content identifier and a region code, a distributor for a region identified by the region code of the corresponding combination;

the authorization request transmitted from the transmitting unit of the playback apparatus to the server apparatus includes a combination of (i) the content identifier of the content to be played back, (ii) the apparatus region code, and (iii) the disc region code; and the control unit is further programmed to determine that the predetermined condition is satisfied when a distributor indicated in a first piece of distributor information matches a distributor indicated in a second piece of distribution information, the first piece of distributor information indicating a distributor for a corresponding combination of the content identifier and the apparatus region code that is the same as the combination of the content identifier and the apparatus region code included in the authorization request, and the second piece of distributor information indicating a distributor for a corresponding combination of the content identifier and the disc region code that is the same as the combination of the content identifier and the disc region code included in the authorization request.

5. The system apparatus of claim 1, wherein:

the server apparatus is programmed to transmit the authorization response along with accompanying information including (i) rating information in a country to which the playback apparatus belongs, and (ii) subtitle data and audio data in a language used in the country to which the playback apparatus belongs; and the playback unit is programmed such that, when the control unit judges that the combination of the content identifier and the apparatus region code satisfies the predetermined condition defined by the owner of the rights of the content, the playback unit plays back the content using the accompanying information.

6. The system of claim 1, wherein:

the server apparatus is programmed to transmit the authorization response along with restriction information;

the content includes a digital stream recorded on the optical disc;

the restriction information is one of (i) information that indicates a part of the digital stream as a playback section and (ii) information that causes only a part of elementary streams multiplexed onto the digital stream to be played back; and the playback unit is programmed such that, when the control unit judges that the combination of the content identifier and the apparatus region code satisfies the predetermined condition defined by the owner of the rights of the content, the playback unit plays back the content using the restriction information.

7. The system of claim 1, wherein:

an exception schedule flag is recorded on the optical disc;

the playback apparatus is programmed such that, when the control unit judges that the combination of the content identifier and the apparatus region code satisfies the predetermined condition defined by the owner of the rights of the content, and when the exception schedule flag indicates that the optical disc is allowed to be played back, the playback unit plays back the content; and the playback apparatus is programmed such that, when the control unit judges that the combination of the content identifier and the apparatus region code does not satisfy the predetermined condition defined by the owner of the rights of the content, and when the exception schedule flag indicates that the optical disc is prohibited from being played back, the playback unit does not play back the content.

* * * * *